(12) United States Patent
Ayers et al.

(10) Patent No.: US 9,099,011 B2
(45) Date of Patent: Aug. 4, 2015

(54) LEARNING TOOL AND METHOD OF RECORDING, REVIEWING, AND ANALYZING FACE-TO-FACE HUMAN INTERACTION

(75) Inventors: James L. Ayers, Minneapolis, MN (US); William J. Schmidt, Minnetonka, MN (US)

(73) Assignee: UfaceME, Inc., Minneapolis, MN (US)

( * ) Notice: Subject to any disclaimer, the term of this patent is extended or adjusted under 35 U.S.C. 154(b) by 199 days.

(21) Appl. No.: 13/459,381

(22) Filed: Apr. 30, 2012

(65) Prior Publication Data
US 2012/0276513 A1    Nov. 1, 2012

Related U.S. Application Data

(60) Provisional application No. 61/480,055, filed on Apr. 29, 2011.

(51) Int. Cl.
G09B 5/00    (2006.01)
G09B 5/06    (2006.01)
G09B 19/00   (2006.01)

(52) U.S. Cl.
CPC .............. *G09B 5/067* (2013.01); *G09B 19/00* (2013.01)

(58) Field of Classification Search
USPC ................................................. 434/309, 310
See application file for complete search history.

(56) References Cited

U.S. PATENT DOCUMENTS

| 6,705,869 B2 | 3/2004 | Schwartz |
| 2005/0026121 A1 | 2/2005 | Leonhard |
| 2008/0167952 A1 | 7/2008 | Blair |

FOREIGN PATENT DOCUMENTS

JP    2007-257330    10/2007

OTHER PUBLICATIONS

International Search Report for international application No. PCT/US2012/035737, dated Nov. 24, 2012 (3 pages).
Written Opinion for international application No. PCT/US2012/035737, dated Nov. 24, 2012 (6 pages).

*Primary Examiner* — Kesha Frisby
(74) *Attorney, Agent, or Firm* — Hamre, Schumann, Mueller & Larson P.C.

(57) ABSTRACT

Two parties have three distinct viewpoints of their relationship, from which assumptions emerge and working hypotheses about how to manage their relationship. The system, device, and method described herein include using computer system mediated learning tool for understanding face-to-face human interactions. The process includes using the learning tool in reviewing an audio-video recording of a face-to-face interaction with one or more persons, whereby one or more of the participants use the learning tool to privately describe their separate viewpoints of the interaction. The participants use the learning tool to receive immediate feedback for analysis, to compare viewpoints, to examine how the viewpoints are arrived, and to explore the viewpoints' consequences for the participants' relationship.

8 Claims, 15 Drawing Sheets

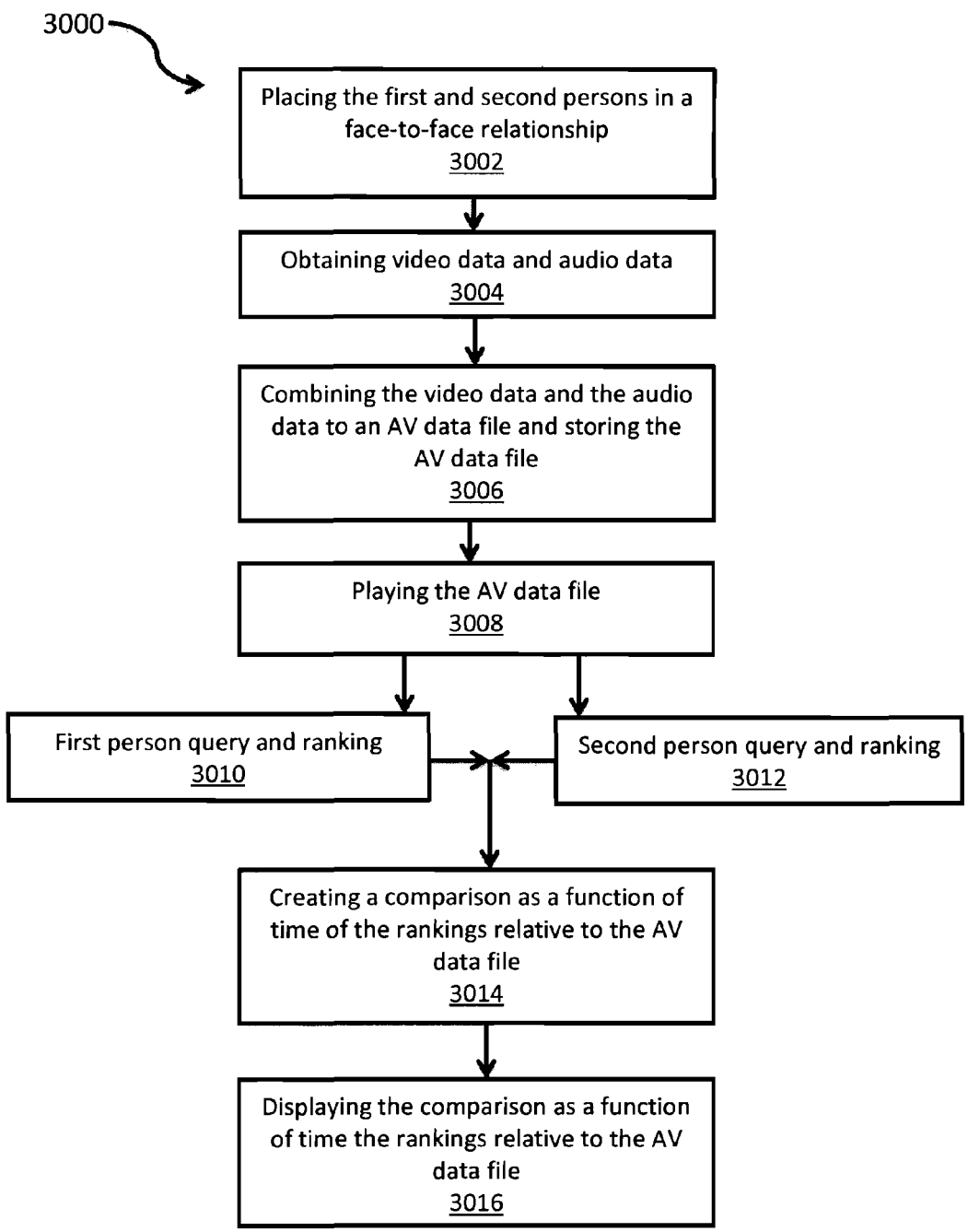

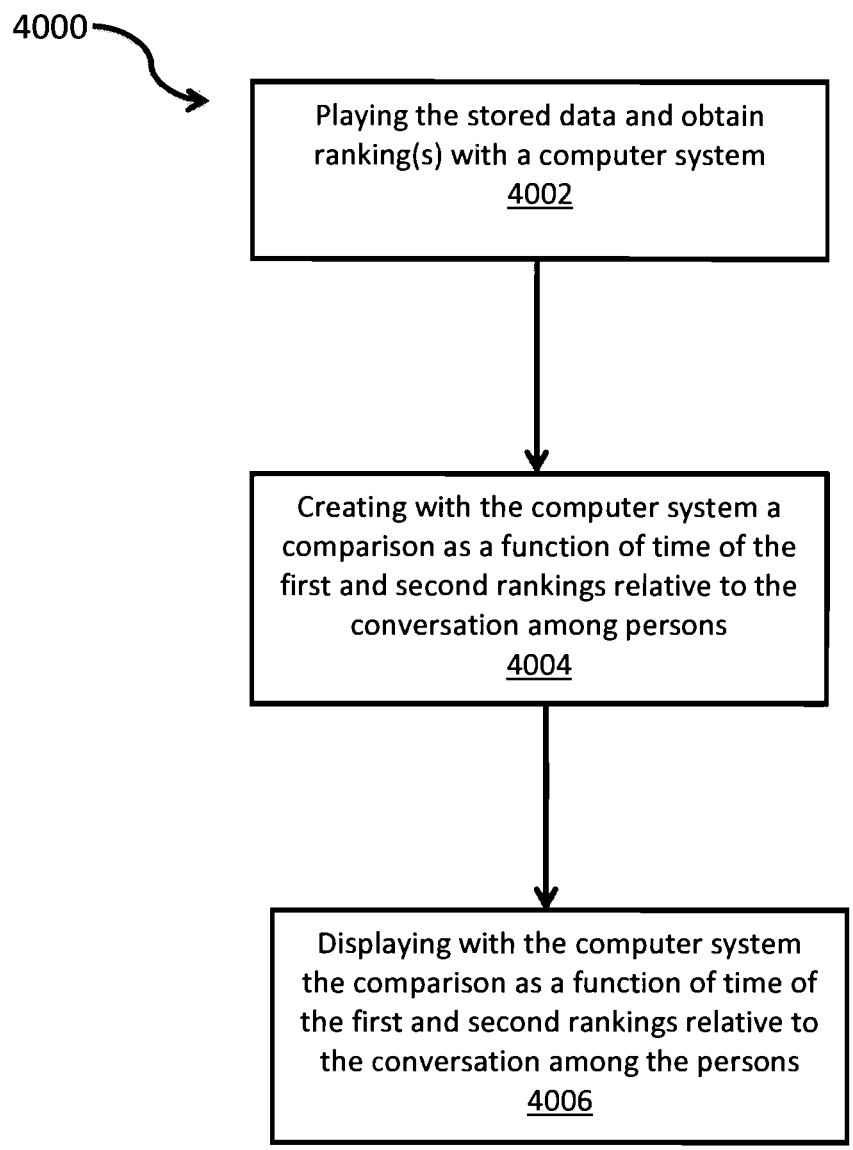

LEARNING TOOL AND METHOD OF RECORDING, REVIEWING, AND ANALYZING FACE-TO-FACE HUMAN INTERACTION

PRIORITY INFORMATION

This application claims the benefit of priority of U.S. Provisional Patent Application No. 61/480,555 filed Apr. 29, 2011 and entitled "SYSTEM, DEVICE, AND METHOD FOR RECORDING, REVIEWING, AND ANALYZING FACE-TO-FACE HUMAN INTERACTION," which is herein incorporated by reference in its entirety.

FIELD

This description relates generally to a computer implemented method, system, and device for face-to-face human interaction and analysis of the interaction.

BACKGROUND

Conventional face-to-face interaction is an interaction between two or more human beings who are physically close enough to each other so as to permit some form of mutual perceptual contact and reciprocal behavioral exchange. Such interactions are immediate and there is no barrier between the interacting parties. There is immediacy of time and proximity of space, which permits mutuality in perception and reciprocity in behaviors of both parties. When people interact via conventional face-to-face interaction, they are close enough to be hit or hugged immediately. Face-to-face interaction is an important phenomenon to human life because it is a conduit, from birth to death, through which individuals influence each other in their daily lives. Face-to-face interactions are the primary experiences that form the foundation of human life.

In contrast to the conventional face-to-face interaction, conventional messaging interaction (e.g. letter writing with paper letters mailed through a postal service), is an example of an interaction where there is both a time and space barrier between participants. There are fundamental differences between the conventional face-to-face interaction and the conventional messaging interaction. The time and space barriers slow down the interaction process and the interaction proceeds in a step-wise process. For example, a message is sent from a sender to a responder, and the responder does not respond to the message until after the message has been received by the responder. The time delay between sender and responder allows the responder time to reflect on his/her response to the message. Because of the separation in time and space, the sender of a message cannot immediately monitor the impact of the message on the receiver. This type of conventional interaction can be slow and cumbersome.

The conventional messaging interaction has dominated human relationships throughout human history, and the media employed (letters, books, accounting ledgers, and documents of all kinds) generate valuable historical records. Such records not only define the relationship between parties but also how the relationship evolved. A good example of this is a correspondence between two people who exchange messages, such as letters, for a length of time. The reactions to each other's viewpoints about different issues can be examined in detail through the analysis of the written documentation in which they exchanged viewpoints. Similar time delay barriers exist when using modern technology, such as, for example, e-mail, instant messaging, texting, blogging, social network posting and responding to the posting.

BRIEF SUMMARY

Face-to-face interactions are considered to be the primary arena where people learn about each other and themselves. Learning, like face-to-face interaction, is central to human life. Learning discussed in this disclosure requires effort and observation in order for learning to actually occur. Observation is essential for learning, and the significance of the method, system, and device described herein is that it is a true learning tool. A personal relationship learning tool allows participants to become co-investigators of their relationship. The learning tool and method described herein can be applied to human interaction to raise significant implications for social change. Most people have been socially conditioned to fear relationship feedback, having received feedback most often when something went wrong so that feedback is usually experienced as critical, uninvited, and presented by some authority. For most people, then, feedback is anticipated to be adverse, something to be avoided at all costs, unless absolutely necessary.

An audio video recording can be a social event because the recording process itself is a catalyst for interpersonal processes inherent in all human relationships. The learning tool and method described herein engages people in comparing viewpoints of self-viewpoint, other's-viewpoint, and social-viewpoint.

When it comes to relationship feedback in human services, for example, most people are often suspicious and fearful. In the human service professions it seems that the more important and personal the service the more fearful service providers are of feedback. The result of this dilemma can result in poor service, provider burnout, loss of initiative by both consumers and providers, and on occasions, serious harm. A provocative illustration of this is evident in how recording technologies have been used in service professions such as medicine, counseling, and various health care professions. In these professions mentoring is the dominant means of training new professionals, but few if any of these professions provide recordings of the mentors actually relating to consumers face-to-face. The usual reason for this omission is confidentiality and protecting the privacy of consumers. The result of this, however, is a view of helping relationships that tend to be one-sided, simplistic, "technique and procedures" focused, and avoidant of consumer feedback. In this setting, then, the method, system, and device described herein is a paradigm shift, because it implements technology with a view of relationships that is interactive, dynamic, and personal. The method, system, and device described herein empowers both participants in giving voice to their experience, by giving both equal authority in learning how they relate. This is in contrast to a conventional view of helping relationships where there are assumptions about power and entitlement, with distinctions between "haves" and "have nots."

There can be a need for relationship learning and facilities already dealing with certain problems. Such facilities can include treatment centers for chemical dependency, mental illness, sexual abuse, domestic violence, trauma from war and torture, and prisons, as well as institutions for professional training in human services, business, and health care.

With the above mentioned considerations in mind, plausible applications of the learning tool and method described herein can be used in settings conducive to relationship learning and protective of potential risks involved. Examples of these settings include, but are not limited to the following.

Prison inmates preparing for reentering society after years of incarceration.

Parishioners of an urban church for learning about each other as individuals and to confront racism one person at a time and examine their own prejudices about each other.

Medical students desiring to relate with their patients more effectively. Physician mentors joining students and their patients to discuss their feedback. Students for developing collaboration skills with each other in an otherwise intensely competitive educational environment. Married students and their spouses to address stress placed on their relationship.

Personnel at a nuclear reactor in an emergency drill practice to identify individual stress levels and issues for teamwork.

Residents of a chemical dependency treatment program throughout treatment to assess their own progress periodically, first with counselors, next with other residents, and eventually with family members.

College students taking classes over the Internet with their academic advisors.

Management consultants while coaching clients in distant locations.

Business persons preparing for international business trips with business partners and clients.

A social networking application for casual conversations and for achieving better understanding of friendships and other relationships.

The learning tool and method described herein provide modes of human interaction mediated by technology, extending the conventional understanding of face-to-face interaction. An example includes a specialized tool having a computer system connected to a camera system where two or more parties interact in real time. The interacting parties can be located generally in the same location as the specialized tool. In another example, the parties can be located at different locations, each party using a specialized tool having a computer system connected to a camera system.

The extension of the face-to-face interaction emphasizes the core definition of the conventional face-to-face interaction, i.e. real-time mutuality and reciprocity. Even when only audio information is exchanged during the interaction, the resulting conversation could be considered to be a face-to-face interaction, because the conversation takes place in real time where both parties can speak and listen.

Many internet sites, such as Facebook and relationship matching services (e.g. dating) include still and/or motion pictures of faces, but they are not truly interactive, because the person being observed is not also observing the observer in real time. This distinction is relevant here because the product described here is applicable to all forms of human face-to-face interaction, regardless of the physical location of the participants. Physical proximity is not considered essential to the definition of face-to-face interaction as used herein, but real-time mutuality and reciprocity is. Face-to-face interaction where participants are physically within aims-reach of each other is considered the conventional face-to-face interaction. Where the participants are remotely located from each other but having an interaction with real-time immediacy is included in the meaning of the face-to-face interaction as used herein.

Face-to-face interaction requires at least two participants. Face-to-face interaction can include more than two participants. The embodiments of the process, system, and device disclosed here in are designed to be applicable to all forms of face-to-face interaction, regardless of the number of participants and/or regardless of their physical proximity. For easier understanding, the embodiments herein describe two-person or dyadic application. Applying the principles described to a group face-to-face interaction is the same method and/or product extended to accommodate more parties.

An embodiment of a personal relationship learning tool for first and second persons includes a camera system to obtain a video data of a substantially face-on first image of the first person and a substantially face-on second image of the second person during a face-to-face conversation between the first and second persons, an audio recording system to obtain audio data of the face-to-face conversation audio of the first and second persons during the face-to-face conversation between the first and second persons, a computer system connected to the camera system and the audio recording device, that receives the video data and the audio data, combines the video data and the audio data to form an audio-video (AV) data file, and stores the AV data file. The computer system is configured to aid in analyzing the AV data file by playing the AV data file, so that during the playing of the AV data file, the computer system provides, at a moment of the AV data file, a first query statement to the first person and a second query statement to the second person. The embodiment of the tool includes a first ranking device connected to the computer system, which allows the first person to provide a first rank to the first query statement, and a second ranking device connected to the computer system, which allows the second person to provide a second rank to the second query statement. The computer system receives the first rank and the second rank; and stores the first rank and the second rank as a comparative rank data. The computer system displays a comparative rank data as a function of time of the AV data file, which shows periods of similarities and differences of the first rank and the second rank, wherein the periods of similarities and differences can be observed and discussed becoming points of learning to first and second persons.

In another embodiment, the camera system includes a prism configured in front of an aperture assembly of a camera, the prism including a first surface, a second surface, and an aperture assembly surface, the substantially face-on first image being received at the first surface of the prism and being refracted towards the aperture assembly of the camera, the substantially face-on second image being received at the second surface of the prism and being refracted towards the aperture assembly of the camera, and the aperture surface facing the aperture assembly of the camera.

In another embodiment, the camera system includes a first aperture for receiving the substantially face-on first image; and a second aperture for receiving the substantially face-on second image.

In another embodiment, the computer system includes a processor which combines the substantially face-on first image and the substantially face-on second image to create a third image that shows at least a portion of the substantially face-on first image and at least a portion of the substantially face-on second image. The computer system includes a display that shows the third image.

In another embodiment, the computer system includes an interface, displayed on a display device of the computer system. The interface includes the third image that shows at least a portion of the substantially face-on first image and at least a portion of the substantially face-on second image, the first query statement including a first statement for the first person to consider and a first viewpoint from which to consider the first statement, the second query statement including a second statement for the second person to consider and a second viewpoint from which to consider the second statement, a graph showing a comparison of the comparative rank data as a function of time, a dynamic synchronization of the third image with a slider control which can be moved along an axis of a time graph, wherein the comparison of the comparative rank data and the third image are displayed synchronized together.

In another embodiment, the review interface includes a bar comparison of averages of the comparison of the comparative rank data for the time graph.

Another embodiment of a personal relationship learning tool for first and second persons includes a review interface for a computer system storing therein an audio-video (AV) data file of a video data and an audio data of a face-to-face conversation between first and second persons, wherein the video data includes a substantially face-on first image of the first person and a substantially face-on second image of the second person during the face-to-face conversation between the first and second persons, the audio data includes a face-to-face conversation audio of the first and second persons during the face-to-face conversation between the first and second persons, the review interface playing synchronously the substantially face-on first image, the substantially face-on second image, and the face-to-face conversation audio. The embodiment includes a ranking system connected to the computer system, which allows the first and second persons to independently provide a rank to a query statement provided by the computer system with respect to the substantially face-on first image, the substantially face-on second image, and the face-to-face conversation audio. The embodiment's review interface displays the rank as a function of time of the AV data file, which shows periods of similarities and differences of the rank, wherein the periods of similarities and differences to be observed and discussed becoming points of learning to first and second persons. The embodiment further includes a camera for obtaining a second video data of the first and second persons during the displaying of the rank as the function of time of the AV data file.

An embodiment of a method of using a personal relationship learning tool for first and second persons, said tool including a camera system which obtains a video data including a substantially face-on first video of the first person and a substantially face-on second video of the second person during a face-to-face conversation between the first and second persons, an audio recording system which obtains an audio data of the first and second persons during the face-to-face conversation between the first and second persons, a computer system which receives the video data and the audio data, a ranking system which allows the first and second persons, respectively and independently, to rank first and second query statements with respect to the face-to-face conversation, comprises placing the first and second persons in a face-to-face relationship, obtaining the video data and the audio data, combining the video data and the audio data to an audio-video (AV) data file and storing the AV data file in the computer system, playing at least a portion of the AV data file with the computer system, and while the AV data file is being played, having the first person consider the first query statement and provide a first ranking with respect to the query statement, and having the second person, independent from the first person, consider the second query statement and provide a second ranking, creating a comparison as a function of time of the first and second rankings relative to the AV data file, and displaying to at least one of the first and second persons the comparison as a function of time of the first and second rankings relative to the AV data file, wherein periods of similarities and differences between the first and second rankings can be observed and discussed, which becomes points of learning.

In another embodiment, the query statement includes a request to assume a viewpoint. In another embodiment, the viewpoint can be one of a self-view, an other-view, and a social view. In another embodiment, the query statement includes a statement to consider when creating the first and second rankings. In another embodiment, the query statement includes a statement to consider when creating the first and second rankings. In another embodiment, the query statement includes a viewpoint which could be one of a self-view, an other view, and a social view, and the query statement also includes a statement with respect to the viewpoint, said method further comprises changing the query statement a plurality of times during the playing at least the portion of the AV data file.

In another embodiment, the personal relationship learning tool for interpersonal relationships comprises a data gathering system during a conversation among persons that gathers data about the persons during the conversation, a computer system connected to the data gathering system for receiving the data, the computer system configured to aid in providing at a moment of the data a first query statement to one of the persons and a second query statement to another of the persons, a first ranking device connected to the computer system allowing said one of the persons to provide a first rank to the first query statement, and a second ranking device connected to the computer system allowing said another of the persons to provide a second rank to the second query statement. The computer system receives the first rank and the second rank and stores them. The computer system displays the first and second rank as comparative rank data as a function of time of the conversation to show periods of similarities and differences of the first and second ranks such that periods of similarities and differences can be observed and discussed to become points of learning about the interpersonal relationships of the persons.

In another embodiment, the method of analyzing data gathered by a personal relationship learning tool, the tool including a data gathering system that gathers data about persons during a conversation among them and a computer system connected to the data gathering system for receiving the data and storing, the tool further including a ranking system which allows at least some of the persons to independently rank first and second query statements with respect to the conversation, the method comprises playing the stored data with the computer system to allow one of the persons to rank a first query statement with the ranking system to obtain a first ranking and to allow another of the persons to rank a second query statement with the ranking system to obtain a second ranking, creating with the computer system a comparison as a function of time of the first and second rankings relative to the conversation among the persons, and displaying with the computer system the comparison as a function of time of the first and second rankings relative to the conversation among the persons, wherein periods of similarities and differences between the first and second rankings can be observed and discussed, which then become points of learning.

In another embodiment, a non-transitory computer readable storage medium stores a set of instructions which when executed by a computer system implement a method for analyzing data gathered by a personal relationship learning tool. The tool includes a data gathering system that gathers data about persons during a conversation among them and the computer system connected to the data gathering system for receiving the data and storing. The tool further includes a ranking system which allows at least some of the persons to independently rank first and second query statements with respect to the conversation. The embodiment of the method comprises playing the stored data with the computer system to allow one of the persons to rank a first query statement with the ranking system to obtain a first ranking and to allow another of the persons to rank a second query statement with the ranking system to obtain a second ranking, creating with the computer system a comparison as a function of time of the first and second rankings relative to the conversation among the persons, and displaying with the computer system the comparison as a function of time of the first and second rankings relative to the conversation among the persons, wherein periods of similarities and differences between the first and second rankings can be observed and discussed, which then become points of learning.

In another embodiment, the non-transitory computer readable storage medium comprises a stored AV data file and a stored associated ranking data file, wherein the stored AV data file and the stored associated ranking data file have been gathered about persons during a conversation among them by using a learning tool which includes a computer system connected to a data gathering system for receiving AV data and storing the AV data as the stored AV data file by the computer system. The learning tool further includes a ranking system which allows at least some of the persons to independently rank first and second query statements with respect to the conversation which is stored as the stored associated ranking data file by the computer system.

BRIEF DESCRIPTION OF THE DRAWINGS

FIG. 21 illustrates a flowchart of a method according to an embodiment.

FIG. 22 illustrates a flowchart of a method according to an embodiment.

DETAILED DESCRIPTION

Figure 1:
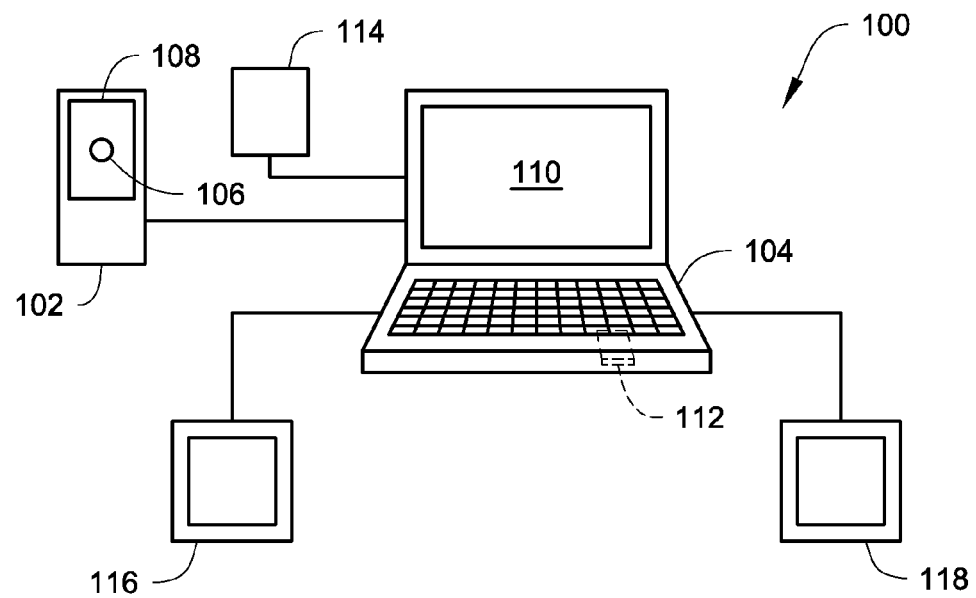
FIG. 1 shows an embodiment of a learning tool.

FIG. 1 shows a personal relationship learning tool 100 including a camera system 102 in communication with a computer system 104. The camera system 102 includes at least one camera 106 having an aperture 108. The camera system 102 is configured to send an image data from the camera system 102 to the computer system 104. The camera system 102 is configured to obtain a video data of a substantially face-on first image of the first person and a substantially face-on second image of the second person during a face-to-face conversation between the first and second persons. The computer system 104 includes a display device 110 for displaying an interface for one or more users to interact with the learning tool 100. The interface displayed on the display device 110 may be one or more of the interfaces described more in detail below, and shown in FIGS. 7-11 and 14-19. The computer system 104 further includes a non-transitory memory device 112 for storing one or more data files. The learning tool 100 includes an audio recording system 114 to obtain audio data of the face-to-face conversation audio of the first and second persons during the face-to-face conversation between the first and second persons. The audio recording system includes a microphone for recording audio. The computer system 104 receives the video data and the audio data, combines the video data and the audio data to form an audio-video (AV) data file, and stores the AV data file. The computer system is configured to aid in analyzing the AV data file by playing the AV data file and displaying the video of the AV data file on the display device 110. During the playing of the video of the AV data file, the computer system 104 can display, at predetermined or random moment during the playtime of the AV data file, one or more query statements via the interface shown on the display device 110. The learning tool 100 includes one or more ranking devices 116, 118. FIG. 1 shows a first ranking device 116 that is connected to the computer system 104, which allows the first person to provide a first rank to a first query statement displayed via the interface shown on the display device 110. A second ranking device 118 is connected to the computer system 104, which allows the second person, independent of the first person, to provide a second rank to a second query statement displayed via the interface shown on the display device 110. The computer system 104 is configured to receive and receives the first rank and the second rank. The computer system 104 then stores the first rank and the second rank as a comparative rank data to the non-transitory memory device 112. The computer system 104 displays on the display device 110 via the interface, a comparative rank data as a function of time of the AV data file, which shows periods of similarities and differences of the first rank and the second rank, wherein the periods of similarities and differences can be observed and discussed, thereby becoming points of learning to the people who were the participants of the recorded face-to-face interaction.

The learning tool 100 can be used for recording primarily the sound of the face-to-face interaction. Recording the sound from the face-to-face interaction provides some data for review and analysis. A function of the audio recording is to act as a stimulus for at least one participant's recall of the face-to-face interaction during the recall process. Accordingly, the recall process can include using the audio only recorded data. A feature of the recall process using only the audio recording is that whatever is recorded can prompt the participant to recall and also serves as a reference point in real time so that query statements can be presented in a structured manner so that the participants can respond at the same points in real time. Thus, the method disclosed herein could be applied to a recorded telephone conversation, Voice Over Internet Protocol (VOIP) conversation, etc. The method includes recording the conversation of at least two participants who may be in separate physical locations. A VOIP implementation can require that each participant use a computer system configured for VOIP and a memory storage medium onto which the recorded conversation is stored.

In another embodiment, the non-transitory memory device 112 is a non-transitory computer readable storage medium which stores a set of instructions which when executed by the computer system 104 implement a method for analyzing data gathered by the personal relationship learning tool 100. The tool 100 includes a data gathering system, which includes the camera system 102 and the audio recording system 114, that gathers data about persons during a conversation among them. The computer system 104 is connected to the data gathering system 102, 114 for receiving the data and storing the data. The tool 100 further includes a ranking system 116, 118, which allows at least some of the persons to independently rank first and second query statements with respect to the conversation. The embodiment of the method comprises playing the stored data with the computer system 104 to allow one of the persons to rank a first query statement with the ranking system 116 to obtain a first ranking and to allow another of the persons to rank a second query statement with the ranking system 118 to obtain a second ranking, creating with the computer system 104 a comparison as a function of time of the first and second rankings relative to the conversation among the persons, and displaying with the computer system 104 the comparison as a function of time of the first and second rankings relative to the conversation among the persons, wherein periods of similarities and differences between the first and second rankings can be observed and discussed, which then become points of learning.

In another embodiment, the non-transitory memory device 112 is a non-transitory computer readable storage medium which comprises a stored AV data file and a stored associated ranking data file, wherein the stored AV data file and the stored associated ranking data file have been gathered about persons during a conversation among them by using the learning tool 100 which includes the computer system 104 connected to a data gathering system 116, 118 for receiving AV data and storing the AV data as the stored AV data file by the computer system 104. The learning tool 100 further includes the ranking system 116, 118 which allows at least some of the persons to independently rank first and second query statements with respect to the conversation which is stored as the stored associated ranking data file by the computer system 104.

Figure 2:
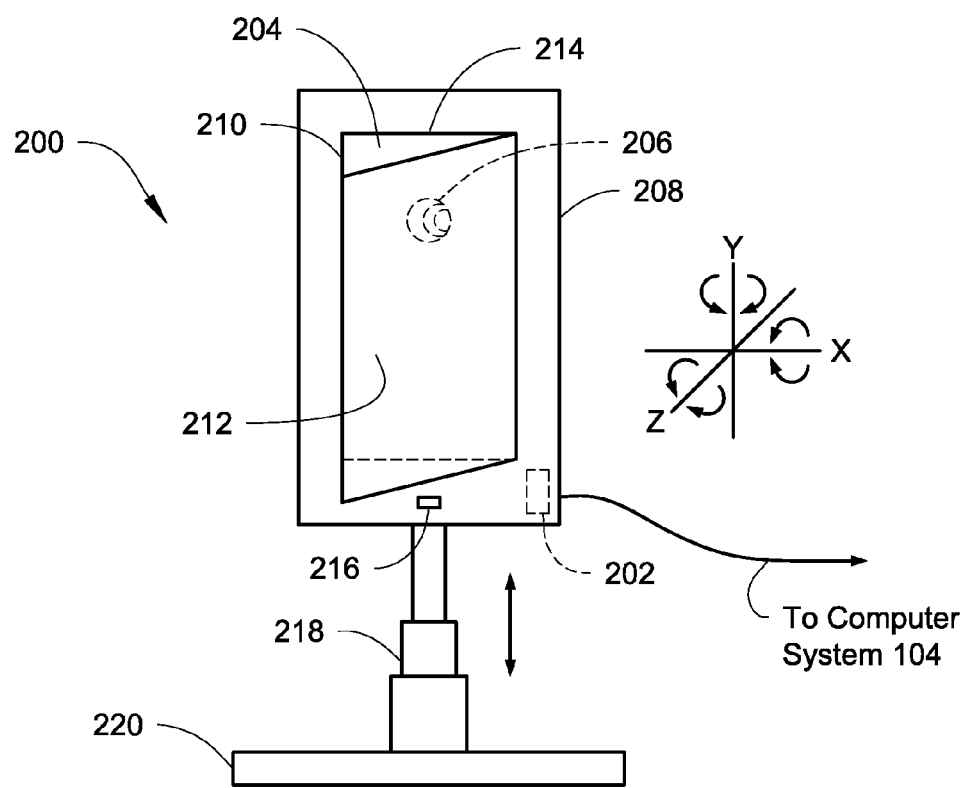
FIG. 2 shows an embodiment of a camera system.

FIG. 2 shows an embodiment of a camera system 200 configured with a communication component 202 configured for sending image data to a computer system 104. It can be preferable for the camera system 200 to be capable of high quality digital recording at various lighting conditions. The camera system 200 includes a prism 204 configured in front of an aperture 206 of a camera 208. The prism 204 has a first surface 210, a second surface 212, and an aperture surface 214. The aperture surface 214 faces the aperture 206. A first image that is received at the first surface 210 of the prism 204 is refracted towards the aperture 206 and passes through the aperture surface 214. A second image received at the second surface 212 is refracted towards the aperture 206 and passes through the aperture surface 214. Thus the prism 204 can combine the first and second images such that the aperture 206 receives the combined image. The combined image is sent to a computer system 104 via the communication component 202.

The camera system 200 can also include the audio system, such as a microphone 216 for capturing the audio data. The audio data is combined with the combined image data as an audio-video (AV) data and sent to the computer system via the communication component 202.

Alternatively, the audio data is sent as a separate data from the video data, and both the audio data and the video data are sent to the computer system via the communication component 202 as separate data. The computer system then can combine the audio data and the video data for creating the AV data. The camera system 200 can include a stand 218 and a base 220. The stand 218 can be a telescoping tube that is configured for changing the height of the camera system 200.

The prism 204 can be an optical quality prism. The prism 204 has internal angles appropriate for capturing images of participants and for refracting the images to form a combined image towards the aperture surface 214 for sending the combined image to the aperture 206 of the camera 208. An embodiment of the prism 204 is an equilateral prism having 60° for each internal angle of the prism 204. For the equilateral prism, the camera system 200 should be positioned midway between the participants at their eye level about 12 inches away from the axis of interaction. The participants are seated, about 2-4 feet apart, facing each other. As participants look directly at each other, each should be able to see the camera system 200 on the periphery of their field of view. The camera system 200 may be connected to the computer system through the USB port. The camera system 200 is configured to be adjusted for height and for tilt to accommodate participants who might be of different heights. The prism 204 optically reverses the images of each person, left to right, just as it would be if they were seeing themselves in a mirror.

Figure 3:
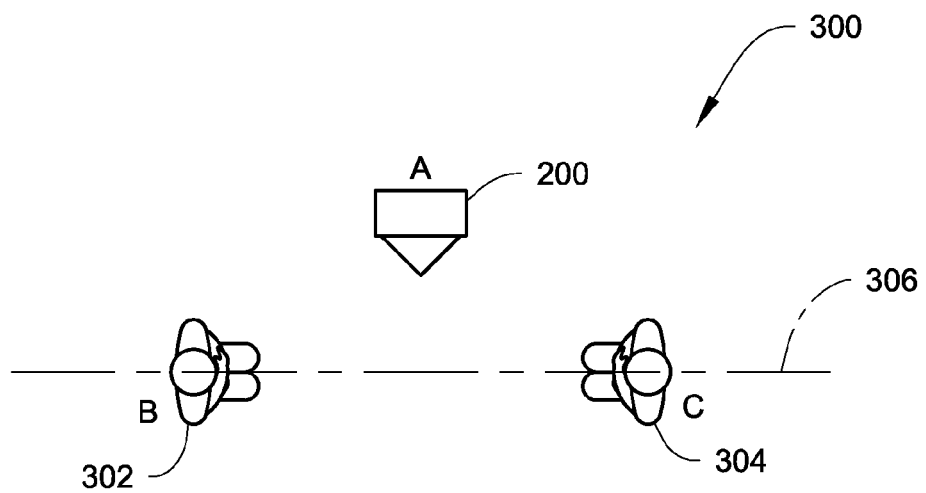
FIG. 3 shows example positions of participants and a camera system.

FIG. 3 show an example of positioning 300 for the camera system 200 and two participants 302, 304. The camera system 200 is placed at position A, two participants 302, 304 at positions B and C, respectively, for engaging in a social interaction, e.g. face-to-face interaction. The two participants 302, 304 face each other along an axis of the interaction 306. The camera system 200 placed at position A is not on the axis of the interaction 306 defined by first person's position B and second person's position C. However, the camera system 200 can capture substantially face-on images of the participants 302, 304, such that facial expressions of the participants 302, 304, such as, eye movement, and/or eye contact between the participants can be recorded. Such information replicates what was available in the face-to-face interaction and stimulates greater recall for the participants. The camera system 200 can be in plain view to both participants.

In another embodiment, the camera system can include at least two cameras, each of the cameras respectively provided to capture substantially face-on images of the participants. An example of such embodiment of the camera system may use a mobile computer system having a digital camera and a microphone. Each camera would record the face-on image of the participants. Then, the recorded video images are cropped, accomplished through a computer software and/or hardware within the mobile computer system and/or a remote computer system that receives the images from the cameras.

Once the face-to-face interaction is finished and the interaction is recorded to a non-transitory memory medium, to a local storage and/or to a remote server's memory, the parties would then proceed to a Reviewing Stage. The Reviewing Stage includes playback of the recorded composite images and/or video for viewing by both parties.

Figure 4:
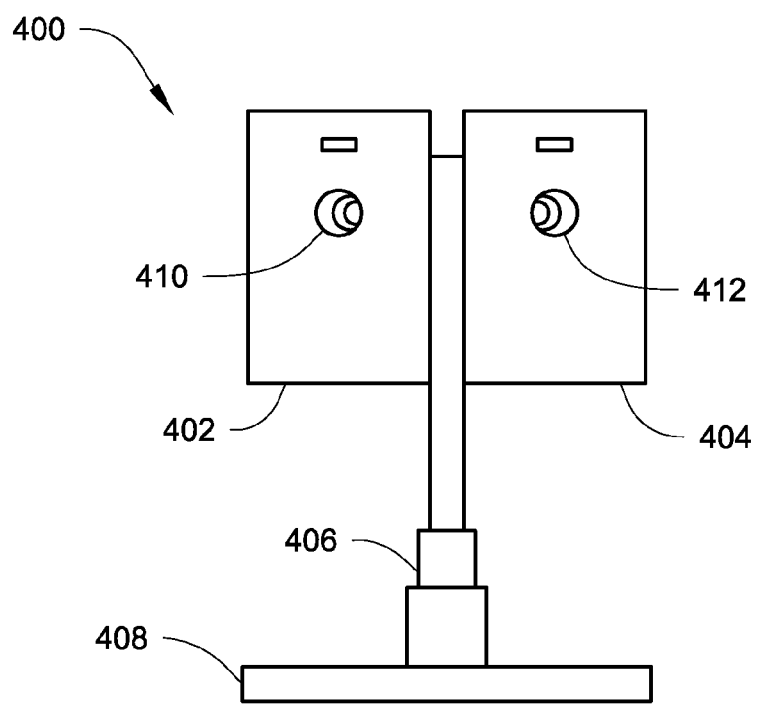
FIG. 4 shows another embodiment of a camera system.

FIG. 4 shows another embodiment of a camera system 400 having a first camera 402 and a second camera 404 connected to a stand 406 and a base 408. The first camera 402 has a first aperture 410 for receiving a first image. The second camera 404 has a second aperture 412 for receiving a second image. The stand 406 is configured to be height adjustable by having a telescoping tube configuration. The first camera 402 has a first view angle, and the second camera 404 has a second view angle. The first camera 402 and the second camera 404 are pivotable and configurable up-and-down, and/or side-to-side. The first camera 402 sends the first image data to a computer system or a video mixer unit. The second camera 404 sends the second image data to the computer system or the video mixer unit. If the video mixer unit receives the first image data and the second image data, the video mixer unit combines at least a portion of the first image data and at least a portion of the second image data to generate a combined image data, and sends the combined image data to the computer system. If the computer system receives the first image data and the second image data, the computer system uses a software method to combine at least a portion of the first image data and at least a portion of the second image data to generate the combined image data. The camera system 400 having the two cameras 402, 404 mounted together can be placed somewhere near the participants. The two cameras 402, 404 can be positioned close to the axis of interaction so that they do not interfere with the sight line between the participants yet capture substantially face-on views of each person. For example, the camera system 400 can be positioned midway between the participants at their eye level about 12 inches away from the axis of interaction. The participants are seated, about 2-4 feet apart, facing each other. As participants look directly at each other, each should be able to see the camera system 400 in their field of view. In another configuration, the camera system is configured to combine signals from the cameras 402, 404 into a single composite images and/or video, transmit the composite images and/or video to a computer system and/or remote server for storage to a non-transitory memory medium. The composite image is stored to the non-transitory memory medium as a digital file and edited so that, when played back, the playback video of the digital file shows each person similar to or as he/she was actually seen by the other person without the images being reversed or mirror images thereof.

Figure 5:
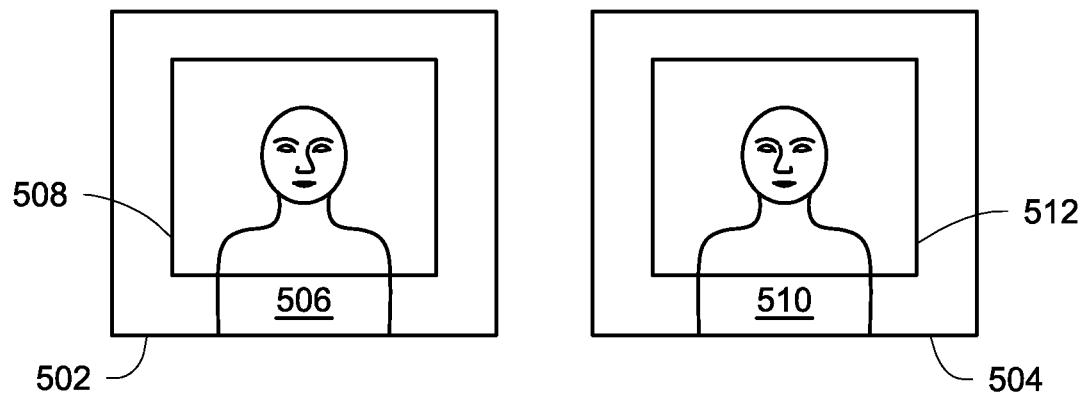
FIG. 5 shows an embodiment of face-on images.

FIG. 5 shows a first image 502 captured by the first camera and a second image 504 captured by the second camera of the camera system 400. The images 502, 504 shown are prior to the images being combined to generate a single composite image and/or video file, for example by a mixer unit, a computer system, and/or a remote server. The first image 502 captured by the first camera shows a substantially face-on image of a first person 506 and first image border area 508 that a mixer unit determines as the crop region for generating the single composite image and/or video file. The second image 504 captured by the second camera shows a substantially face-on image of a second person 510 and a second image border area 512 that a mixer unit determines as the crop region for generating the single composite image and/or video file.

Figure 6:
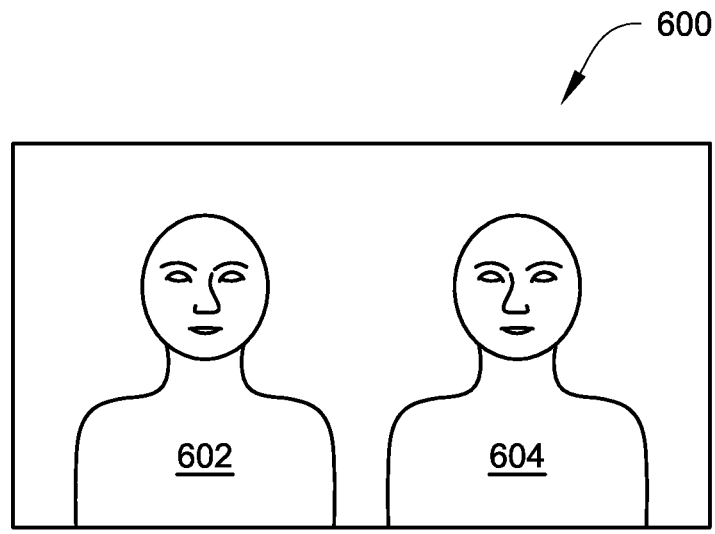
FIG. 6 shows an embodiment of a combined image.

FIG. 6 shows an embodiment of a video recording image 600 of two persons' 602, 604 face-to-face interaction. The image 600 can be achieved by using the camera systems 200, 400 described above. Note that both people 602, 604 shown in the image 600 are substantially face-on, which means that they are recorded close to the angle from which each was viewed by the other person. Thus, during a video playback, the participants see the other as well as his or her facial image. The video recording image 600 may include frames and/or borders to dress up the image 600, such as for example, an interface having a border displayed over the image 600 between the two people 602, 604.

A single composite image combined from a plurality of images from a combination of the embodiments of the camera system with more than two people participating in a face-to-face interaction is also possible. Recording the interaction of more than two people is similar to recording two persons, i.e. along the interaction axis of the participants. The participants should remain stationary, either sitting in a circle or on both sides of a table. Two cameras can be positioned to shoot over the heads of the participants on each side, and the separate video signals can be combined in a video mixer to form a composite video image.

Examples of a computer system in accordance with the present invention include one or more of a desktop computer, laptop computer, smart mobile device, tablet, mobile phone, mobile personal entertainment device, cloud computing device. An example smart mobile device can be, for example, a tablet, ebook, iPod, iPad, iPhone, a smart phone, etc. The smart mobile device includes a non-transitory memory for storing computer instructions that store a computer product and/or a user interface instructions for recording, reviewing, and analyzing, which could be carried out on each unit separately or in conjunction with a server. The advantage of such instrumentation is its simplicity and flexibility, allowing it to be used in various settings. For example, the tablet device having a touch screen, the controls can be provided via software and displayed as a user interface. The mobile computer system can include a camera, a sound input, and a sound output. The smart mobile device can connect via a wireless network, such as WiFi, cellular, 3G, 4G, etc., to receive downloads of data and transmit data via the internet to a remote server. The smart mobile device can be configured to be fully operable without any connection to the internet or a network, providing security and capacity to protect privacy, which in some settings would be most critical. This means that the participants themselves have total control over all stages of the process and over any distribution of recordings and data. Examples of such an application include legal/forensic settings, chemical dependency and psychiatric treatment settings, military settings, and business settings requiring private collaborations.

A non-transitory memory medium can provide a virtual computer system which converts almost any computer system into an operational instrument for the method described herein, by means of a flash drive containing all necessary software. For security, the flash drive could have its own security lock (such as the fingerprint of the user) in order to operate. When inserted into a computer system the flash drive downloads the computer instructions for the methods described herein, executes the computer instructions, and stores the recorded conversations and collected data. The advantage of this system is its flexibility without compromising security. However, it may be restricted in memory size and access to software updates.

The user interface can be a part of a social networking web interface and/or application. The video files are stored in a remote server, cataloged and readily reviewable by the parties who are the participants. The video file may be shared with others with permission from one or more of the participants. The video file may be shared with others when only all of the participants provide permission for sharing. The cataloged and stored video files at a remote server provides a secure recording of a face-to-face interaction. The system also provides for a participating and recording a face-to-face interaction when using a computer system that is publicly shared, such as those at a public library, workplace, and/or coffee shops. Further, because each file is a record of a particular interaction, the participants can readily review the face-to-face interaction again and again, and even append the file to continue the interaction from where the conversation ended. Thus, the system provides for a chain of face-to-face interactions to be stored, cataloged, and searchable for the convenience of the participants and/or reviewer. Further, the analysis stage that is performed by the system can provide valuable information about the relationship between the participants. In the modern social networking and social sharing age, such analysis can be extremely valuable and entertaining.

An embodiment of an interface is presented in detail in FIGS. 7-15 to illustrate how the review strategy and structure according the learning tool are implemented.

Figure 7:
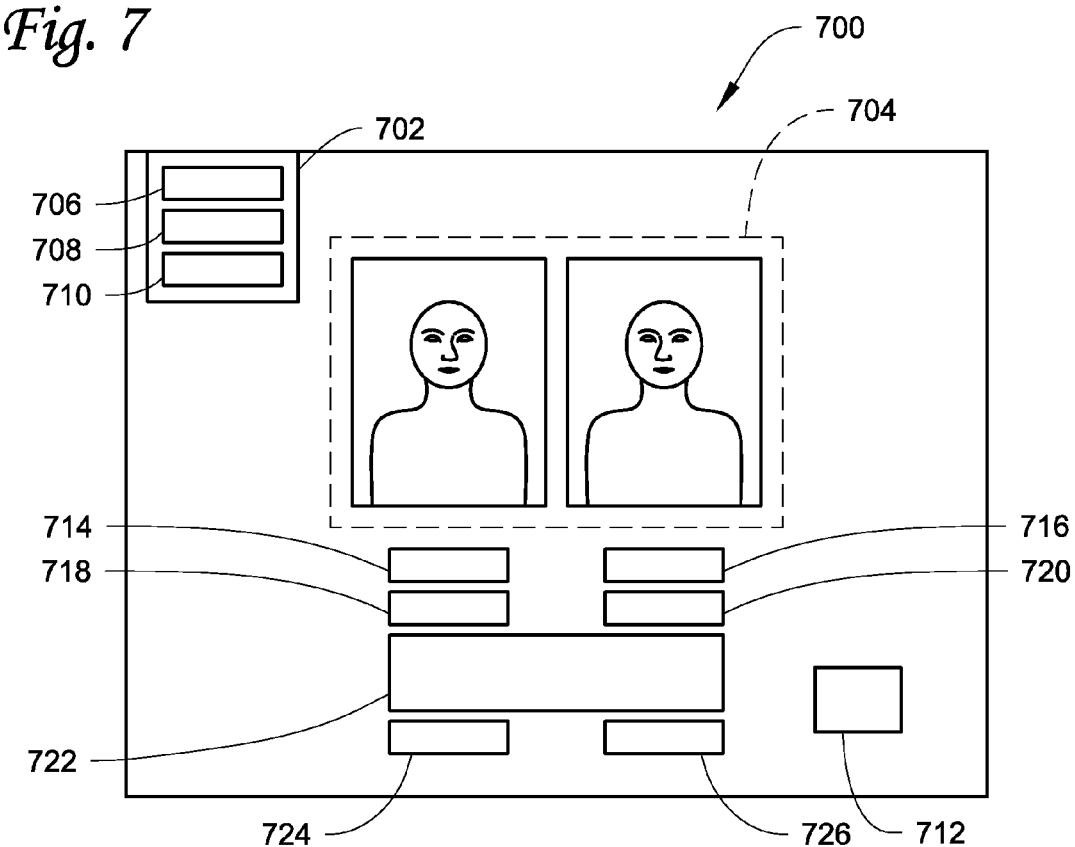
FIG. 7 shows an embodiment of a user interface.

FIG. 7 shows an embodiment of a user interface 700 displayed on a display of a computer system. The user interface 700 shown is for implementing Stage 1, or the Recording Stage. A participant accesses his/her account by entering their identification information that is associated with the recorded data and/or user account. The user interface includes a drop-down menu 702 that presents choices for recording a new conversation, accessing a previously recorded video, or feedback analyses for a session, or exiting the system. The video display portion 704 shows an example video of two participants as it would appear when they are conversing, but it would not be present until the participants activate and/or set up the camera system. In this example, the interface 700 provides a border over the video image that divides the image such that each person is shown in what appears to be separate windows. The menu 702 has a preview button 706 which, when clicked, turns on the camera system so the participants can position themselves and the camera system suitably so both of the participants will always be on camera during the recording. The menu 702 has a capture button 708 which, when clicked, starts the recording process. The recording video continues to be displayed on the screen, and the participants can tilt the computer display downwards so they are not distracted by it. First time participants may not want to have the video recording screen visible as they converse. Persons who have had little or no experience with being video recorded often report feeling self-conscious, especially if their previous experiences have been unpleasant. However, once they become engaged in their conversation, participants typically report they ignore recording apparatus and video screen. The menu 702 includes a stop button 710 which, when clicked, stops the recording process and moves the participants on to Stage 2 and changes the interface to the interface shown in FIG. 8 (described in detail below). The length of the conversation is usually determined by the participants themselves, but it could be preset by the participants or an administrator who agreed on a specific time limit before their conversation. One determining factor for the length of the conversation is the time necessary to view it and receive feedback analyses of their results. Typically a conversation of about 20 minutes allows for completion of all three steps within an hour. The participants determine who stops the conversation.

If there are external devices connected to the computer system, there are window displays 712 that allow the external devices, such as external video and/or audio devices to be used for the interactive session, for example, if an external camera plugged into a USB port of the computer system is to be used and not be the webcam internal to the computer system. However, under some conditions participants might choose to use the internal camera system with a prism. Window 714 displays the identification information, such as the first name of the first participant. Window 716 displays the identification information, such as the first name of the second participant. These windows 714, 716 display the identification information of each participant, with the left-right position being consistent with their position on the video display portion 704. The position selection windows 718, 720, when clicked, establish which person is seated on the left or right, not only as they are seated before the computer system but also on the video recording screen. The participants may select their names from the menu of users 722 displayed at the bottom of the user interface 700. The menu of users 722 displays participants and information. The actual identifying information gathered from participants can vary, depending on the application, whether it is for personal use, teaching, research, or some specific service such as counseling, sales, or coaching. Each participant, however, can be assigned a unique identification number. The Add Name button 724 allows a participant to enter their identification information into the menu of users 722. The Update button 726 permits a participant who has already entered information into the menu of users 722 to modify and update their entered data.

As an example, a conversation may include some purpose and agenda agreed upon by the participants, especially when there is some service being provided by one participant to the other, such as in health services, sales services and training services, and business services. The face-to-face interactions in different settings with different agendas, standards of practice, etc. are understandably quite different, but a premise of the empirical method is that there are always common elements and viewpoints which the participants themselves can observe and report. Also, even within a conversation with clearly agreed upon goals and agenda, as participants interact they make decisions about how to proceed in accomplishing an agenda. With these considerations in mind, it is important to note that the procedure does not require any specific agenda or topic of conversation. Indeed, from the empirical perspective of the process, the topic or agenda of the conversation can be deemed irrelevant. Participants can talk about anything, anyway they choose, whatever their viewpoints of each other, because the process focuses not so much on what they do face to face but on how they view what they do. It is their viewpoints of themselves and each other that matters, and the method and the learning tool described herein allow the participants themselves to define and report their viewpoints in an empirical fashion, wherein their viewpoints are anchored in observable events of which both participants are not only observing but also being observed. The conversation ends at a predetermined time agreed on by the participants or they may decide when they have spoken long enough. The recording ends when they click on the Stop button 710. It is also possible that during the course of their conversation they may be interrupted (e.g. an unexpected telephone call, a bathroom break, etc.), in which case they can pause the recording process and resume after the break. Typically, however, the conversation proceeds without interruption and when participants stop the recording process, they can move on to Stage 2, the Reviewing Stage.

Figure 8:
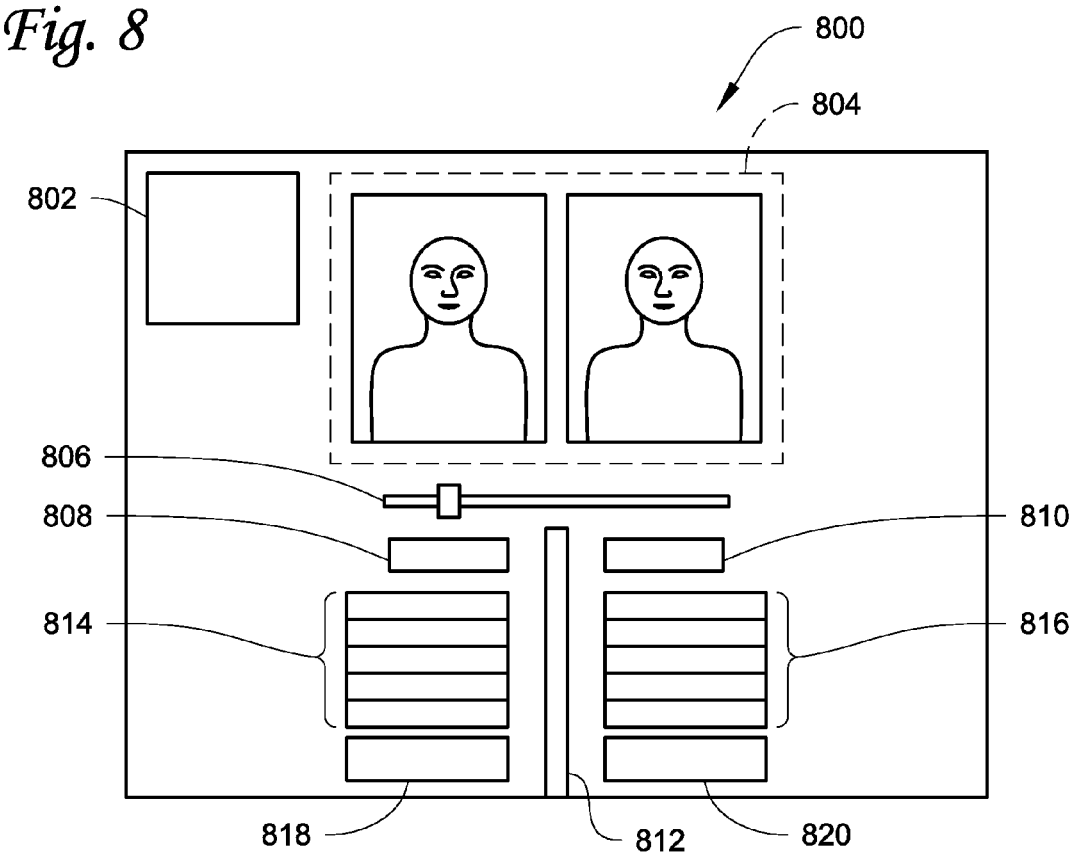
FIG. 8 shows an embodiment of a user interface.

FIG. 8 shows an example user interface 800 for the Reviewing Stage. The Reviewing Stage may include one or more of the following procedures.

1. Establishing a location for suitable viewing and responding to a recorded conversation;
2. Selecting which recorded conversation to view;
3. Positioning of participants relative to the computer system;

4. Placing vertical blinder on computer system screen if necessary;
5. Plugging in wearing headphones if necessary;
6. Practicing with apparatus (optional);
7. Starting the video playback;
8. Responding to query statements;
9. Pausing the viewing process if unexpected interruptions occur;
10. Variations in how and when the viewing takes place; and/or
11. Variations in types of response apparatus.

Establishing a location for suitable viewing and responding to the recorded conversation is similar to establishing the location for a private, uninterrupted conversation. Stage 2 requires the formation of a setting where viewing can be done in privacy and without interruptions. A private room without visual distractions or background noises may be preferable, such as in an office, living room, kitchen or possibly seating in a vehicle. Participants should have adequate seating to relax and focus on the task at hand. Yet, in certain circumstances, it might be preferable for participants to view and respond in a large room where other people are present and talking. In such a case, the participants can seat themselves with their backs to a wall and place the computer system on a table facing them. Both of them would wear headphones to hear the soundtrack of their conversation. Participants need to be attentive to time available to them for viewing, since viewing and responding requires a few minutes more than the length of the conversation itself.

When participants move directly to Stage 2 after completing Stage 1, they will not need to choose which recorded conversation to view. On the other hand, it is possible for them to start with Stage 2 after a period of time has passed. For Stage 2, the user interface allows the participant to select and access the desired video data file for playback and to perform the Review Stage.

The interface 800 has a data file window 802 listing the various recorded conversations as a selectable data listing. Each conversation data file is labeled with the date and identification information of the participants. The data file window 802 is configured to allow the data to be searchable, organizable, and/or selectable for accessing the data via the user interface. The playback screen display 804 shows the video file being played back, with both participants, each viewed from the perspective of the other person. Once the participants start the viewing process, the video recording plays back preferably nonstop. The nonstop playback allows for review data to be gathered in real time. The video control slider bar 806 may be provided to indicate which point in time the recorded video is being shown. The identification windows 808, 810 display the identification information of each participant, with the left-right position being consistent with their position on the playback screen display 804.

When the user interface 800 is being shared by both participants during the Review Stage, a screen divider 812 preferably is placed on the lower half of the computer system screen so that each person can view only his/her lower section of the computer system screen where both query statements and response choices are presented. The function of the screen divider 812 is to provide query statements to and responses from each participant, which are fully independent so that their observations are empirical and unbiased. Response choices windows 814, 816 are presented to each participant.

The wording and number of choices (ranks) of the response choices can vary to accommodate different applications, and the response options represent a range of choices from low to high, from which a participant can select. Also, the response choices do not change while participants are viewing their conversation in order to provide consistency over time, a feature that permits participants to assess changes over the course of their conversation. Response choices windows 814, 816 show five response choices ranging from "Not At All" to "Very Much." Each participant can select a response choice. The chosen response is highlighted in a color specific to each participant (e.g. red, green, etc.). Participants may change their response choice as long as the query statement is on the screen. It is possible for a participant to make no response to a query statement by not selecting on one of the options while the query statement is being presented. An embodiment of the user interface 800 presents query statements preferably for ten seconds with a five-second latency or pause period between query statements. When a participant does not respond to a query statement, this is also considered to be relevant information, such as, for example: 1) the participant doesn't have enough time to respond, 2) the participant became involved in the recorded conversation and forgot to respond, or 3) the participant is not responding at all, possibly not even attending to the video recording. Query statement Windows 818, 820 display the specific query statements, one to each participant. The user interface 800 shows one dimension of affect, "Confused," being queried at the same instant from both participants but from two different viewpoints. Mary on the left side is reporting she feels "A Little Confused," and her partner, John, on the right side, is reporting she seems to be "Not At All Confused." Thus, the Self-View of one participant can be compared later with the partner's Other-View in the Analysis Stage from the data entered by the participants during the Reviewing Stage.

The user interface 800 includes a viewing process that permits a number of variations as to when, how, and by whom Stage 2 is completed. These options include, but are not limited to the following.
1. The viewing process can be paused by the participants and can be resumed.
2. The participants may decide to view only a portion of their conversation or all of their conversation.
3. The participants could take a break after Stage 1 (Recording) and continue with Stage 2 at a later time.
4. The participants could take turns completing Stage 2, and their separate data files combined for Stage 3 feedback which they could discuss together or at a later time.
5. The same video recording could be viewed by observers other than the participants on the recording. In such cases the query statements could be identical to those given the original participants or an entirely different set of query statements. The method, system, and device described herein allows for a great deal of flexibility for such purposes as intervention, training, and research in such diverse settings as health services, sales, business, and education. For example, medical students in a class on interviewing could view a recording of their instructor interviewing a patient, and as they watch, they are also presented with the same query statements answered by the patient, and each student attempts to identify how the patient responded. Students respond on handheld wireless units, and their responses are compared with the responses of the patient. Whatever the variations, there is a consistent linking between a particular face-to-face recorded event and a particular set of query statements.

Several kinds of data are collected as participants are responding to query statements. The response to each query statement is recorded to the memory of a computer system and/or server, including no response to a query statement. A no response to a query statement is considered relevant information which the participants themselves could clarify. The query statements are displayed on the screen for a limited time, e.g. 10 seconds with a 5-seconds pause between query statements, and are presented at a regular cadence, e.g. every 15 seconds. The regular cadence helps the participants habituate to the response task and does not change regardless of what happened in the face-to-face interaction. The response time for each query statement is also recorded, and this is calculated by the time between onset of a query statement presentation and the final response choice before the end of the presentation time. Response times are considered to be valuable information in assessing not only the ability of a participant to complete the task but also identify task complexity. Other forms of data collection are also possible. For example, participants could wear a finger clip that would monitor heart rate and galvanic skin response during their face-to-face interaction in Stage 1 and as they are completing Stage 2. Participants may have physiological reactions when they are actually conversing and when they are viewing their conversation, and the physiological measures may correlate with the responses to query statements. Data is gathered in real time directly from the participants themselves in an efficient, systematic way that is relevant to how the participants understand and relate to each other.

Figure 9A:
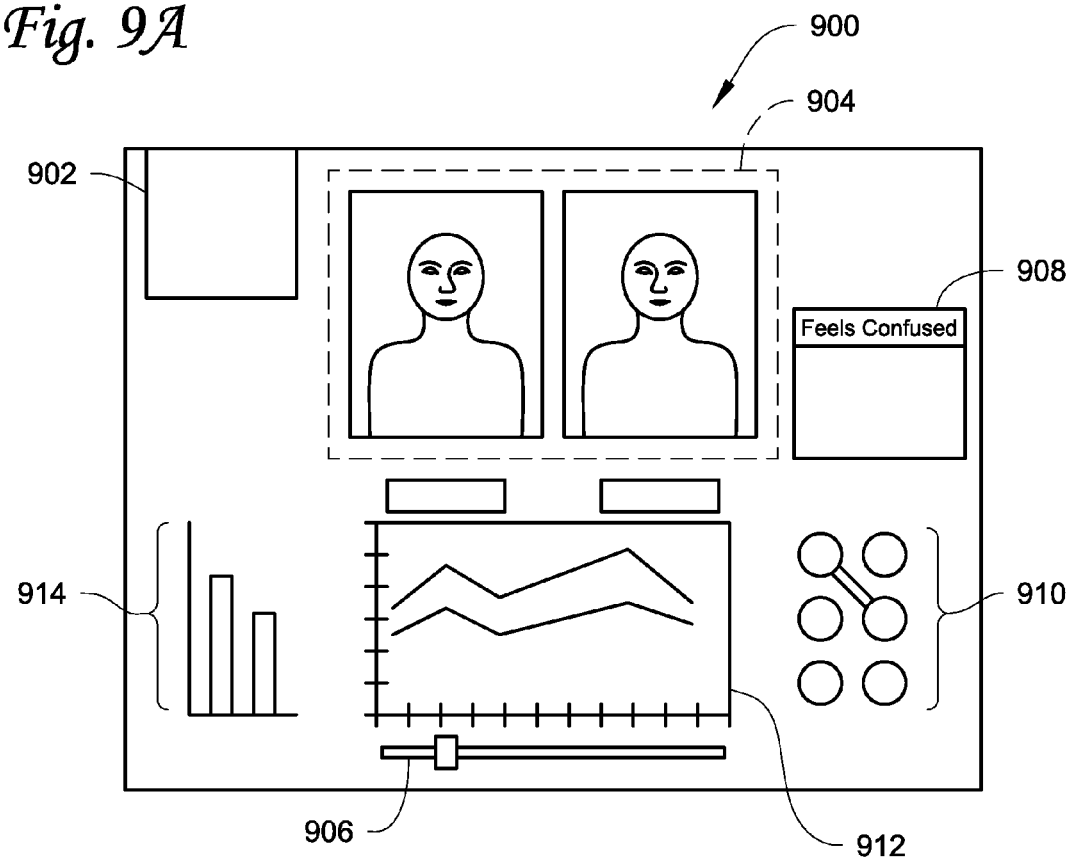
FIG. 9A shows an embodiment of a user interface.

FIG. 9A shows a user interface 900 for the Analyzing Stage of the learning tool described herein. The user interface 900 provides feedback and analyses of results to both participants in a highly visual and interactive fashion. The user interface 900 engages the participants by identifying elements and rankings, and comparing the elements and rankings across the real time of the conversation. This information becomes easily accessible and presented in an intuitive, easily understandable way, which promotes learning. The learning tool described herein may include the user interface 900 as a relationship learning laboratory tool to engage and measure participants' perceptions, assumptions, and hypotheses about each other. This is the Knowledge of Results principle: we learn to the extent we know the outcomes of our efforts.

The user interface 900 shows a dropdown menu of options 902 from which a participant can choose to capture a new video, view a previously recorded video, and/or view an analysis of data collected from a reviewed video. The user interface 900 includes options to increase and/or to decrease the size of the video displayed on the computer system screen. The Left Report presents results for the person seated on the left, in this example Mary. The Right Report presents results for the person on the right, which in this example is John.

The user interface 900 includes a video screen 904 for displaying the video selected to be viewed. The video screen 904 shows the participants as they were recorded. The video screen 904 also shows the time frame (minute:second, e.g. 10:20) of the AV data file as the video is played back. A slider control 906 is provided so that it can be moved by the viewer back and forth so that any part of the recorded conversation can be immediately accessed. The affect dimensions menu 908 shows the affect dimensions and rankings that are analyzed. In the example shown in FIG. 9, the affect dimension "feels confused" is being analyzed. Clicking on any one of the other dimensions in the menu 908 would reconfigure field display 910 and graph display 912. The field display 910 shows the identification information, e.g. the first name, of each participant, and their three viewpoints (Self-View, Other-View, Social-View) below the identification information. The viewpoints are shown with connections that visually display assumptions of the viewpoints, described more in detail below (and shown in FIGS. 14-16). Clicking first on the viewpoint of one person and next on a viewpoint of the other person highlights both fields and displays a line connecting both viewpoints. In this way, the user interface 900 allows attention to be focused on exactly which viewpoints are being compared. Inside each viewpoint box includes text information, which states the viewpoint in terms of the dimension selected in field display 910 (e.g. "confused"). A graph display 912 shows a graph of the individual responses of each participant over time. Averaged field 914 shows an average of both rankings in graphic form. The slider 906 shown below the graph display 912 is synchronized with the graph display 912 and the video display, so that participants can move the graph slider 906 to a position of interest on the graph display 912 and the video display on the video screen 904 will also display that synchronized moment.

This synchronization between the graph 912 and the video display on the video screen 904 allows participants to clarify and share their viewpoints, not in abstract generalities but in the specific context from which their viewpoints were derived. When they compare their viewpoints, they become engaged in a process of examining and testing out the accuracy of their viewpoints. When participants respond to a query statement, they are doing so in the context of specific face-to-face events, events which can be interpreted in several ways. This is to say that a participant's responses to query statements could be based on: 1) overt behaviors of the other person, 2) overt behaviors of the participant, 3) memories of past events which somehow influence a participant's perception, 4) interpersonal factors between the participants (e.g. perception of authority, and past experiences in the relationship history of both participants). The point here is that when a participant responds to a query statement or set of query statements, it may not be self-evident to others why he/she responded in a particular manner. The best person to explain responses to query statements is the participant him/herself, and invariably participants seem to come up with understandable reasons for their responses.

Figure 9B:
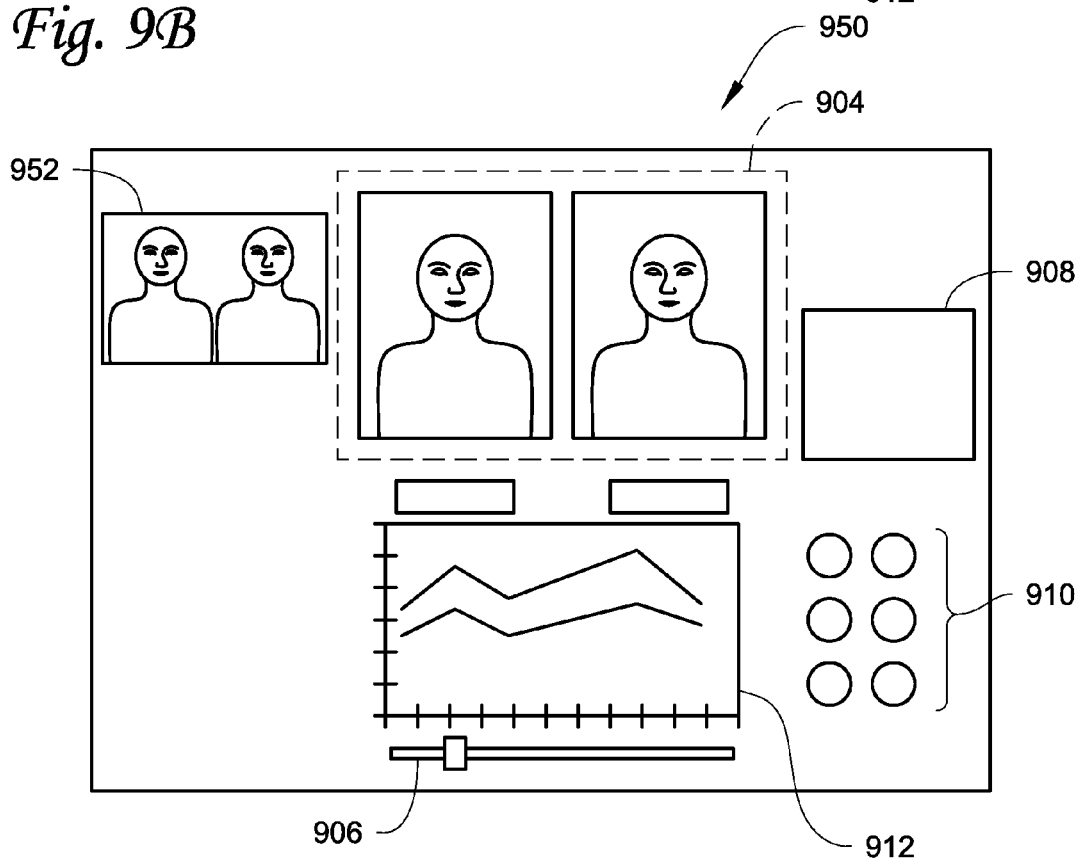
FIG. 9B shows another embodiment of a user interface.

FIG. 9B shows another example interface 950, that is similar to the interface 900 shown in FIG. 9A, but also includes another video window 952 showing and which can capture another image and/or video of the substantially face-on image(s) of persons reviewing the AV data file. Other parts of the interface 950 are similar to those in interface 900 and similar components are identified using the same reference characters. The interface 950 provides another means of capturing yet another social interaction of the participants as they review, recall, and discuss the moments of similarities and differences in their viewpoints. When the recording process is on, the interface 950 records, not only the image shown in the video window 952, but also all of the interactions the participants perform with the interface 950. Audio conversation is also recorded. Thus, a new AV data file is created that includes the face-on images of the participants shown in the video window 952, and all of the clicks and interface changes that the participants perform as they interact with the interface 950, and the audio conversation during the discussion that can be had between the participants. This can lead to further comprehension and further learning of the social relationship between the participants.

Figure 10:
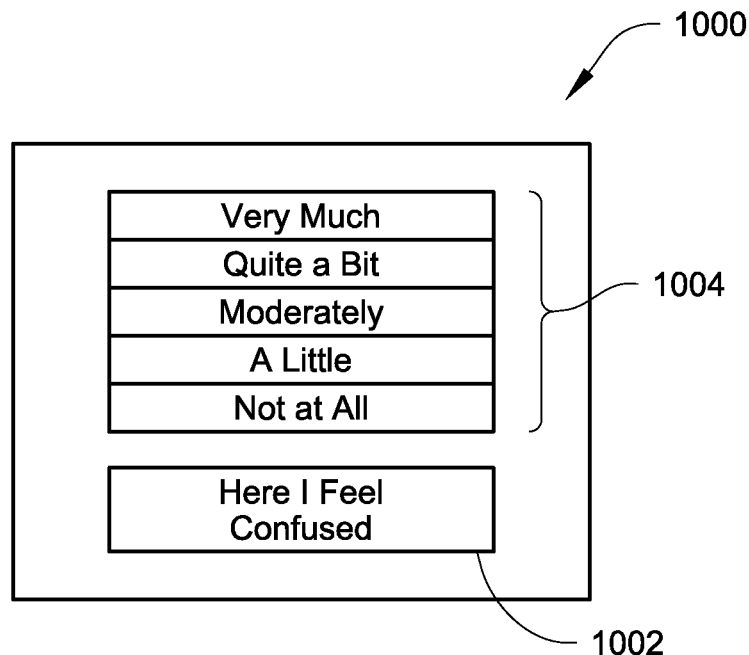
FIG. 10 shows an embodiment of a user interface.

FIG. 10 shows an example of a user interface 1000 (or a portion of a user interface) for responding to a query statement 1002 when an audio record is being reviewed. The function of the audio recording is to provide something to review, and the main function of the audio recording is to act as a stimulus for recall. The recall process, then, is not entirely dependent on a video recording. A feature is that whatever is recorded prompts recall and serves as a reference point in real time so that query statements are presented in a structured manner so that both participants are responding at the same points in real time. A sound recording can prompt recall. Thus recording the conversation of two participants who are in separate physical locations, each with a computer system onto which the recorded conversation is stored. The possible response choices 1004 are provided in the interface 1000.

Figure 11:
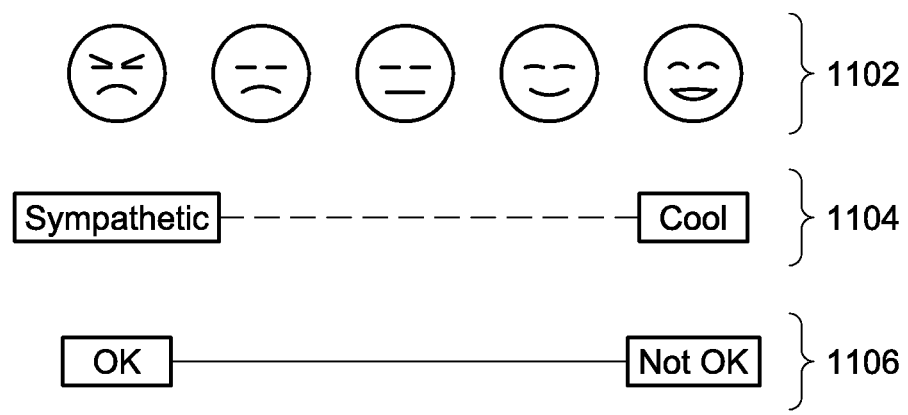
FIG. 11 shows embodiments of query statements and/or responses for the user interface.

The structure of the query statement presentation can include the elements of face-to-face interactions, i.e. multiple viewpoints, affect, and other interpretive rankings. Various affect labels can be employed as long as they sample the dimensions of affect described previously. FIG. 11 shows some example query statement responses. Query statements need not consist only of words but could also be symbolic as described previously. Likewise, the response choices may vary from a binary choice (yes, no) to multiple-choice. Social psychology research has developed various ranking scales, which might be applied. For example, icons representing varying degrees of emotional states 1102 may be used as responses to query statements. For example, semantic differential words to indicate their preference 1104 may be used. For example, a simple continuum without gradations 1106 may be used.

The language used for the query statements and responses can be any spoken language, preferably being the language preferred by the participants. It is also possible for query statements to be presented in the native language of each participant. For example, query statements to one participant might be in French and Arabic to another. For multilingual inquiries, translated query statements should be tested for accuracy of meaning. For query statements using affect labels, comparable translations should not be limited to the meaning of particular words but should sample the different dimensions of affect.

The timing of the query statements can vary, both for the duration of query statement presentation and for the latency interval between query statements. Certain applications and populations may require a slower or faster rate of presentation. Because the reaction times for each query statement are recorded, it is possible to identify optimal timing parameters for query statement presentation and latency between query statements. Likewise, analysis of the reactions times for different query statements, viewpoints, and affect dimensions may yield significant information relevant to understanding face-to-face interactions. The query statements are linked in real time to the video playback so the context of the query statement response can be identified.

For group applications, there are multiple viewers who are all presented with identical query statements, and each viewer responds privately by means of wireless instrumentation. While all participants in the group are presented with the same query statement, the participants also complete several identifying query statements, such as gender, age, race, job responsibility, etc. The analysis stage presents aggregate results for the entire group as well as separating the results for different groups. For some applications the identifying query statements might include personality types, such as Introvert . . . Extrovert, or different personal preferences. Likewise, the query statements might refer to different viewpoints, Self, Other, Social. Groups can have some agenda, and specific query statements might be tailored to address issues relevant to the agenda.

The participants can review their interactions that include themselves. But once a recording has been made, the recording can be reviewed by other people and in several different ways. For example, a recording of a dyad might be reviewed, but rather than by the original participants, other persons might attempt to answer the original query statements as if they were the person on the screen. Analysis of the results would involve comparing responses of the secondary viewers with the responses of the original participants. This application would seem to have much potential in training people to gain listening and empathy skills. Another variation would be to have an entire group review a dyad recording and respond to the original query statements. Such an application may help people learn certain tasks, such as interviewing or specific counseling skills.

Figure 12:
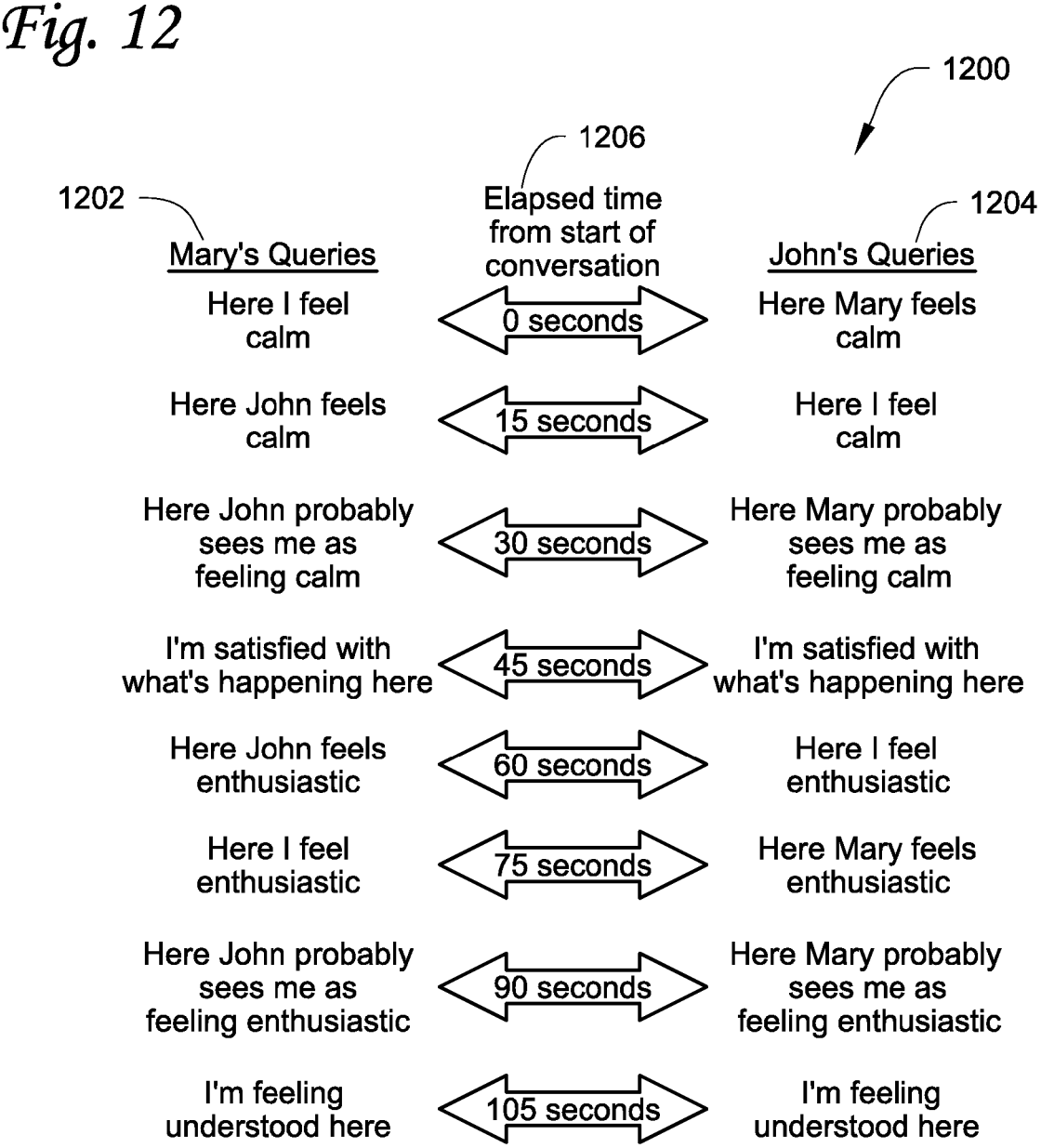
FIG. 12 shows an example of a comparison of query statements between two people in time.

FIG. 12 shows an example review inquiry 1200 showing a first person's query statement data 1202, being compared to a second person's query statement data 1204. The first and second persons respond privately and cannot see the responses of the other's. Thus, the autonomous, independent observation of each is protected so that the viewpoints are truly independent and not immediately influenced by the other person's responses. The first and second persons are not comparing notes as they observe, and independence of reporting gives credibility to any patterns that emerge from data analysis. It also gives credibility to the persons themselves, who respond, for better or for worse, and can recognize their own responses. This independence between observers forms the foundation of empirical inquiry and engages participants in their own scientific inquiry. The observations are synchronized along the timeline 1206 in real time with the playback recording of behavioral events, each observation is anchored in the behavioral record. Thus, "snapshots" can be examined in reference not just to time but also the behavioral context. Both first and second persons make observations from three distinct viewpoints: 1) Self viewpoint: how the first person views herself; how the second person views himself, 2) Other viewpoint: how the first person views the second person; how second person views the first person, and 3) Social viewpoint: how the first person thinks the second person is viewing her; how the second person thinks the first person is viewing him. Observations from each viewpoint may vary as to how much they are based on overt behaviors and/or covert private cognitions that include both current perceptions and recall of past experiences. Observation data are in response to specific query statements (usually about affect) presented at 15-second intervals and repeated over the duration of the viewing. The query statements are not open-ended but present a scale of choices such as: "not at all", "a little", "moderately", "quite a bit", "very much." This structure permits quantification and objective measurement, which forms a database to identify patterns not only within a single session but also across multiple sessions by the same or different participants. Quantification also permits a summary of meaningful data for the purpose of research, training, and learning. The observation data are not only synchronized to the behavioral record but they are also linked together by the behavioral record on the recording so that both first and second persons are observing the same overt behaviors but from different points of view. This pairing or linking of query statements permits meaningful data analysis and discussion about different viewpoints by the participants.

The fixed sequence of query statements can be repeated. This structure is like a net of questions catching the observations of both participants over their entire interaction. For example, each participant might be asked to rank how comfortable he/she felt every four minutes. After a 40-minute conversation, each participant would have reported his/her level of comfort ten times.

Because participants are observing their face-to-face interaction, each observer is also the object of observation by the other person. This is done empirically by pairing different points of view (self-view for Person A and other-view for Person B). Examples of this reciprocal pairing occur at, for example, seconds 0, 15, 60 and 75. This reciprocal pairing of query statements makes it possible to assess perceptiveness and expressiveness, because it permits correlating the Self-View of one person with the Other-View of the other person which are synchronized to occur at the same instant in time. Likewise, the social-view (how I think the other person is viewing me) engages each person in hypothesizing how he or she thinks they are coming across to the other.

Figure 13:
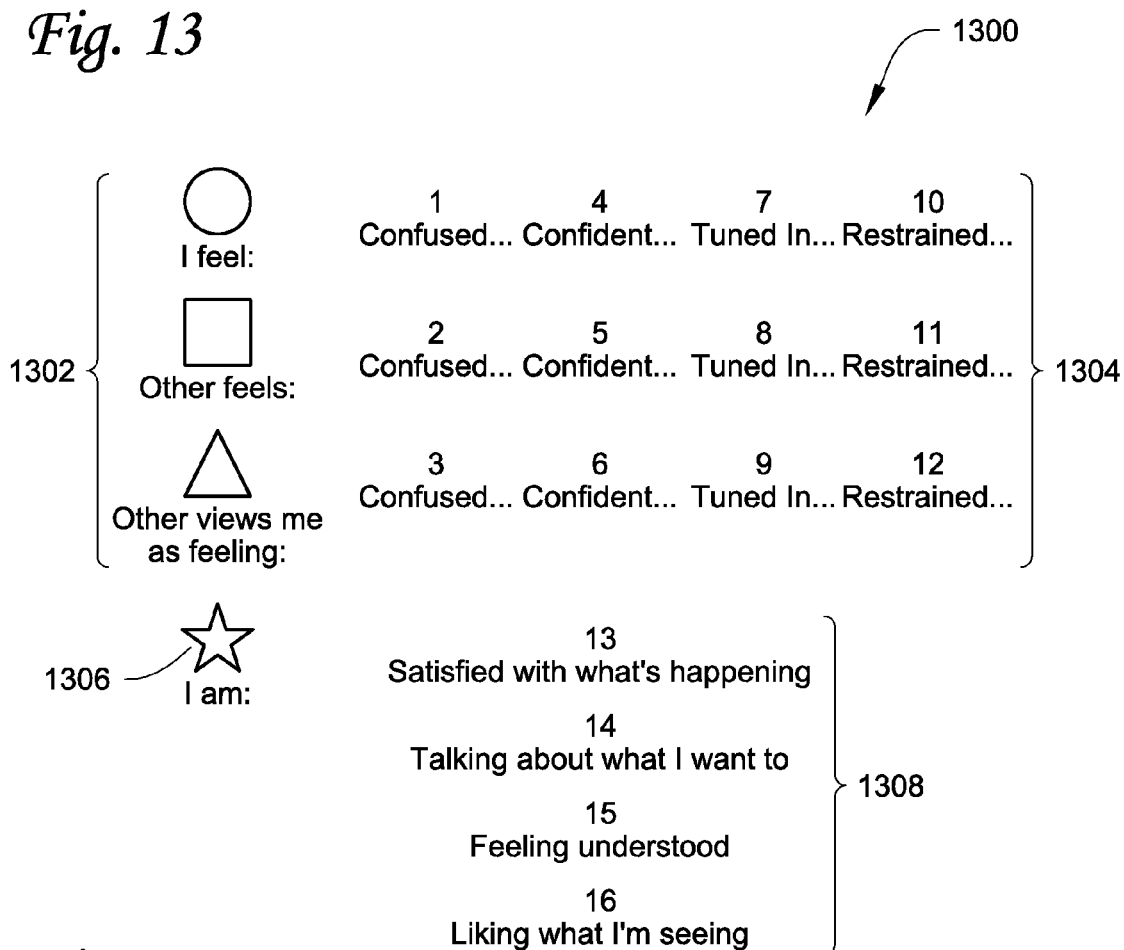
FIG. 13 shows an example of query statement structure.

FIG. 13 shows example query statement structure 1300 which include three viewpoints 1302, four dimensions of affect 1304, and a cognitive assessment 1306 with four cognitive assessment rankings 1308. In this embodiment, there are sixteen query statements with multiple viewpoints, and so on. These query statements are presented to both persons (Person A, Person B in this example). Thus an example Query statement that can be presented is "Here I feel Confused." Another Query statement that can be presented is "Here (name of partner) feels confused." Another Query statement that can be presented is "Right here (name of partner) probably views me as feeling confused." Another Query statement that can be presented is "Here I feel Confident." Another Query statement that can be presented is "Here I feel understood." And so on. These query statements are preset, and the actual affect labels may vary, but query statements are from the same affect dimension, e.g. high negative affect, and so forth. The position of each dimension on the inquiry net provides for consistency, making analysis of the results more efficient when different affect labels are used.

The process for the method described herein is to define a process that is virtually invisible and unnoticed until assumptions are proven wrong. This process is considered here to be at the core of human understanding and misunderstanding. The following illustrates this process with reference to a single, static dimension, perception of physical height. The elements of this process are two individuals, each with three viewpoints. When viewpoints are compared, they form the basis for relationship assumptions. When relationship assumptions lead to behavioral actions, they can be considered as hypotheses which both parties use as working assumptions to test the validity of their assumptions.

To focus on the process is to emphasize the fact that when people are face to face, they not only observe each other, but they also make themselves available to be observed. When they allow themselves to be observed, they attempt to observe themselves through the eyes of another. Thus, three levels of observation forming the foundation of the three viewpoints, Self, Other, and Social, are possible. Human beings are always defining and understanding ourselves, not so much abstractly, but specifically, in how we see ourselves in relationship and relating to other human beings.

Figure 14:
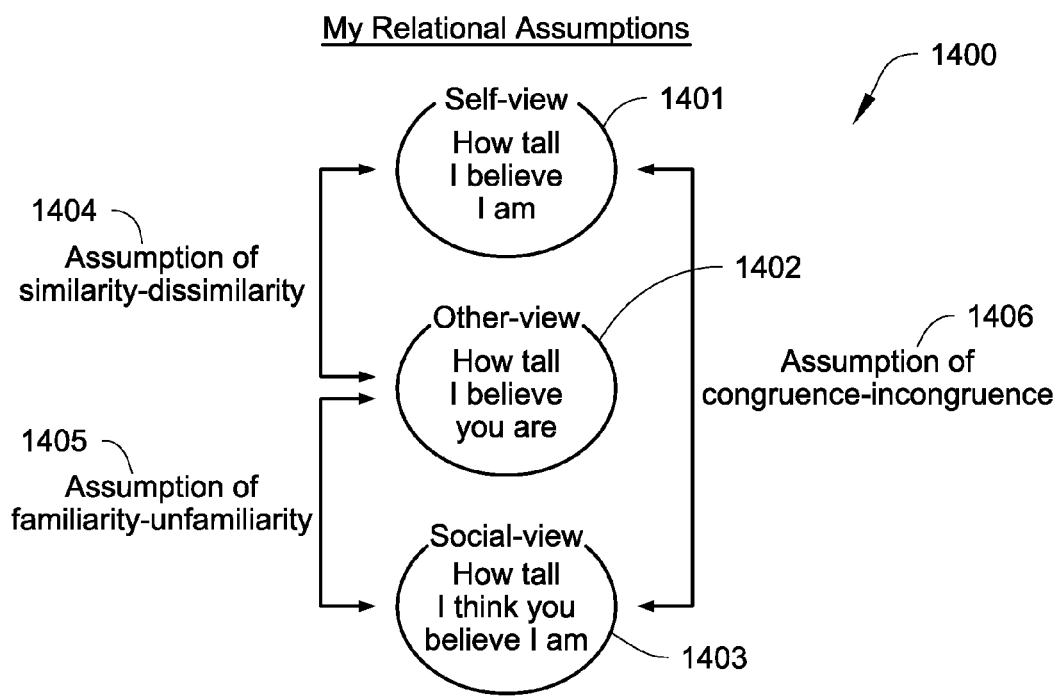
FIG. 14 shows an example of relational assumptions of the three viewpoints.

FIG. 14 shows the elements of this process 1400, which involves three viewpoints: 1) Self-View 1401 (how I view myself), 2) Other-View 1402 (how I view the other person), 3) Social-View 1403 (how I think another person views me). The simplest human relationship is comprised of two people, a dyad. Both parties have three viewpoints 1401, 1402, 1403 and they can state these viewpoints 1401, 1402, 1403 along any number of dimensions, for example: height, weight, age, and gender. Using physical height as a dimension of comparison, one can state his/her belief about his/her own height, his/her estimate of another's height, and his/her estimate of another's belief of one's height. These three viewpoints 1401, 1402, 1403 are always present and when viewpoints 1401, 1402, 1403 are compared, they can also be considered as assumptions.

An assumption is defined here as any viewpoint assumed to be true until proven otherwise. The assumptions 1404, 1405, 1406 become apparent when we compare viewpoints 1401, 1402, 1403. In relational terms we are always comparing, (i.e. defining, understanding, measuring) ourselves to others.

Figure 15:
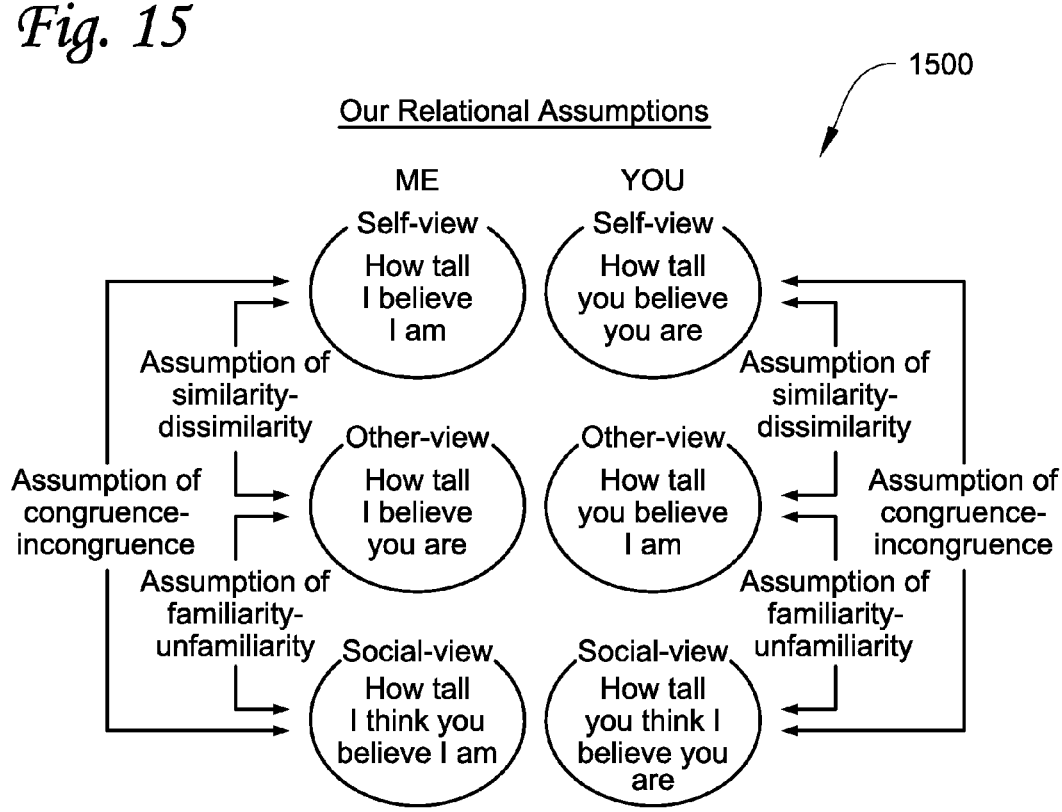
FIG. 15 shows an example of relational assumptions of the three viewpoints between two people.

FIG. 15 shows an example of comparing viewpoints and relational assumptions 1500. When different viewpoints are compared, assumptions become evident, and the first step in dealing with assumptions is to define them. An assumption of similarity (or dissimilarity) is implicit in comparing my self-view with my other-view, e.g. how tall one believes he/is is compared to how tall he believes the other to be. If these two viewpoints are very close, an assumption of similarity is made. If they are very different, an assumption of dissimilarity is made. An assumption of familiarity (or unfamiliarity) is implicit in comparing one's other-view with one's social-view, e.g. how tall one believes another to be is compared to how tall one thinks another believes one to be. An assumption of congruence (or incongruence) is implicit in comparing one's self-view with one's social-view, e.g. how tall one believes one to be is compared to how tall one thinks another believes the one to be. The premise being that the minds are always active with these three basic viewpoints when dealing with human relationships even though humans might not be aware of them. Our minds are always monitoring positions relative to surroundings, best exemplified by our perceptual-motor nervous system. The five senses monitor the surroundings and supply information to the brain, which integrates this information so as to direct the motor activity in the surroundings, which, in turn, changes one's perception. Relational assumptions are part of the perceptual motor processes as the mind integrates information it perceives about other human beings. FIG. 15 shows some of these assumptions in regard to a rather static dimension, perception of physical height. When these assumptions arise from viewpoints about another person, it is possible to make additional comparisons of viewpoints, the viewpoints of the other person, viewpoints not only within each person (i.e. assumptions) but also between persons.

Figure 16:
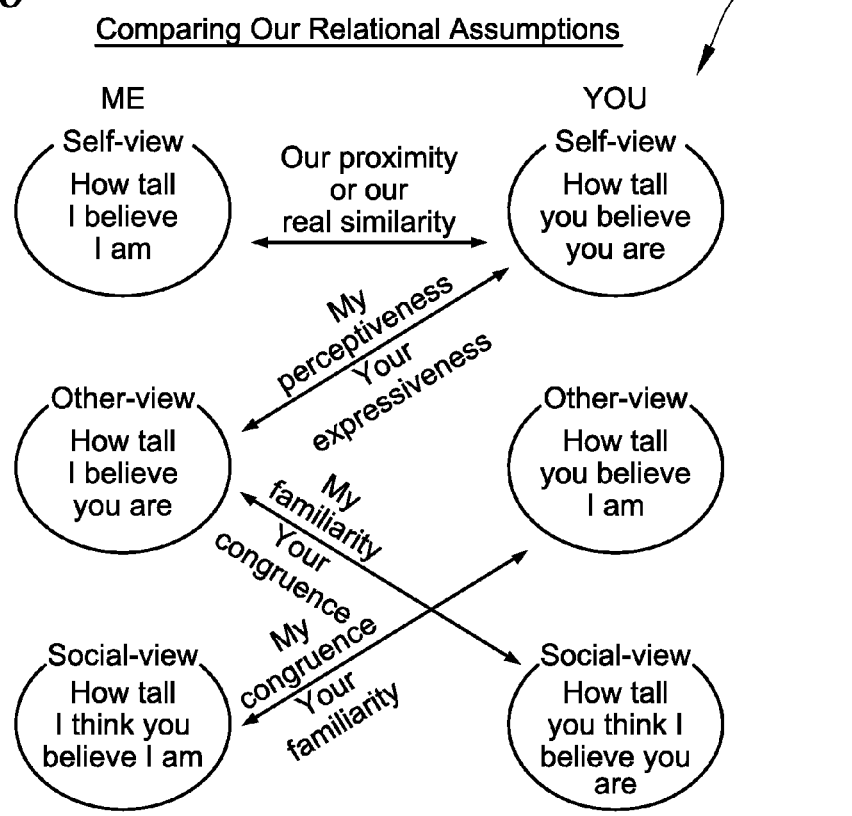
FIG. 16 shows an example of a comparison of relational assumptions between two people.

FIG. 16 shows an example of comparing the viewpoints between people for interpersonal hypothesis testing 1600. Assumptions emerge from comparison of each person's viewpoints, and assumptions can be considered as hypotheses each person has about the other. Hypotheses are working assumptions, i.e. assumptions, which have behavioral consequences and which are not assumed as true until proven otherwise. The validity or "truth" of a hypothesis can be tested when one person's hypothesis matches or agrees with another person's hypothesis. FIG. 16 shows how testing can occur when different viewpoints are compared between two persons. For the sake of illustration the dimension of each viewpoint is perception of physical height, a static dimension, which does not change quickly, and for this reason the time frame and behavioral context for the comparisons is not critical. It makes little difference whether both parties state their viewpoints an hour, a day, or even weeks apart from each other. In this example time is not a factor, and the focus here is on the comparisons between each person's viewpoints. Proximity or real similarity is used herein as the degree of similarity between the Self-Views of both persons. This is the place to start any comparison of viewpoints between persons.

When dealing with relational assumptions or hypotheses, the first consideration is to clarify how much in agreement both parties are independent of their views of each other. This is done by a comparison of each person's Self-View reported independently. Failure to take this into account leads to confusion about the other viewpoints (Other and Social). For example, if one person seems very accurate in describing another person, it's always possible that the first person is not distinguishing between the three viewpoints and is simply projecting his/her Self-View, which could be very accurate, if both persons are indeed very similar.

Perceptiveness is used herein as the comparison between my Other-View and your Self-View. If one can identify how another sees himself/herself, the one can be considered to be perceptive. Perceptiveness implies expressiveness. The reciprocal of one person's perceptiveness is the other person's expressiveness. Some people are more expressive than others, and this is a factor that can influence how perceptive other people are in relation to them. With our example of perception of physical height, people express their height differently, i.e. some have more erect posture, making their physical height more evident to others. In the example of FIG. 16, only "My" perceptiveness is depicted, for the sake of simplicity. But "Your" perceptiveness could also be represented by an arrow connecting Your Other-View and My Self-View. When considering perceptiveness, it becomes clear that proximity or real similarity between two people needs to be taken into account. When two people are very similar (e.g. they have the same physical height), it may not be possible to separate perceptiveness from mere projection. It's as if to say: "If everybody is just like me, then I'm always accurate in perceiving them. My relational assumptions are always true." However, when two people are indeed different on some dimension, then perceptiveness (and expressiveness) becomes more important in accuracy. This would occur when our Self-Views are quite different.

Familiarity and Congruence are comparisons between the Other-View and Social-View across both persons. Familiarity is defined here as the comparison between My Other-View and Your Social-View. If how one sees another matches how another thinks the one sees the other, one can be considered to be quite familiar with the other. Congruence is used herein as the comparison between My Social-View and Your Other-View. If how one thinks another views the one matches how another actually views the one, then the one can be considered to be congruent. The reciprocal of familiarity is congruence. That is, another's congruence is the reciprocal of the one's familiarity, and the another's familiarity is the reciprocal of the one's congruence.

Figure 17:
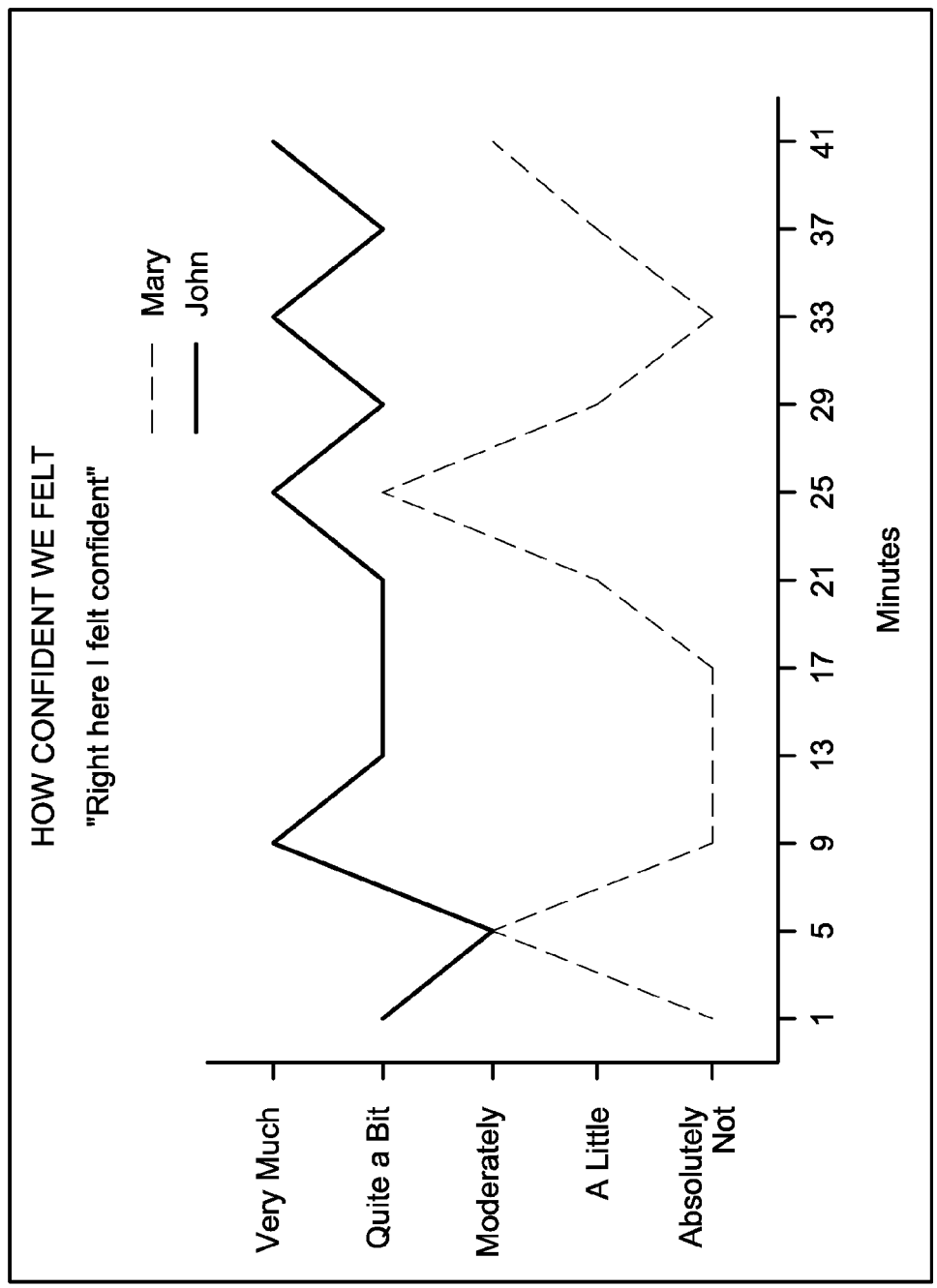
FIG. 17 shows an example of a graphic display of a time sequence data analysis.

FIG. 17 shows an example of a summary of individual responses with graphic display 1700. The graphic display 1700 can be provided in the graph display portion of the user interface. Individual responses to a single query statement can be summarized and presented visually so that each response can be viewed in reference when it was made in real time. This is done with a graphic display that shows a sequence of individual responses over time as in FIG. 17 where the Self-Views about feeling confident from both persons are presented. As FIG. 17 shows, there is some variability in how confident the two participants, e.g. Mary and John, reported feeling, with John reporting a higher level of confidence overall. Minute 9 is striking because both persons reported very different levels of confidence. Mary viewed herself as most confident at minute 25. When presented with such a graph, participants often cannot recall the specifics that led them to respond in a certain way. However, they can replay the exact moments of their recorded conversation when they responded to the query statement, at which time they usually recall the basis for their particular response. One feature of the method, system, and device described herein is the ability to link viewpoints with the behavioral events that contributed to the viewpoints. When this linkage takes place, learning can occur both at the individual and relationship levels. In Knowledge of Results terms, the graphs connect viewpoints (anticipated results) with behavioral actions and provide observed results. Such connections generate the associations necessary for individual learning to occur. Relationship learning occurs because the responses of both participants are presented over time, allowing them to compare viewpoints and see together what simply cannot be seen alone. The graphs help participants to look back in an empirical way, allowing them to see for themselves. This process is at the core of learning, discovery learning rather than performance learning. The feedback engages participants in experimenting and discovering on their own initiative.

Figure 18:
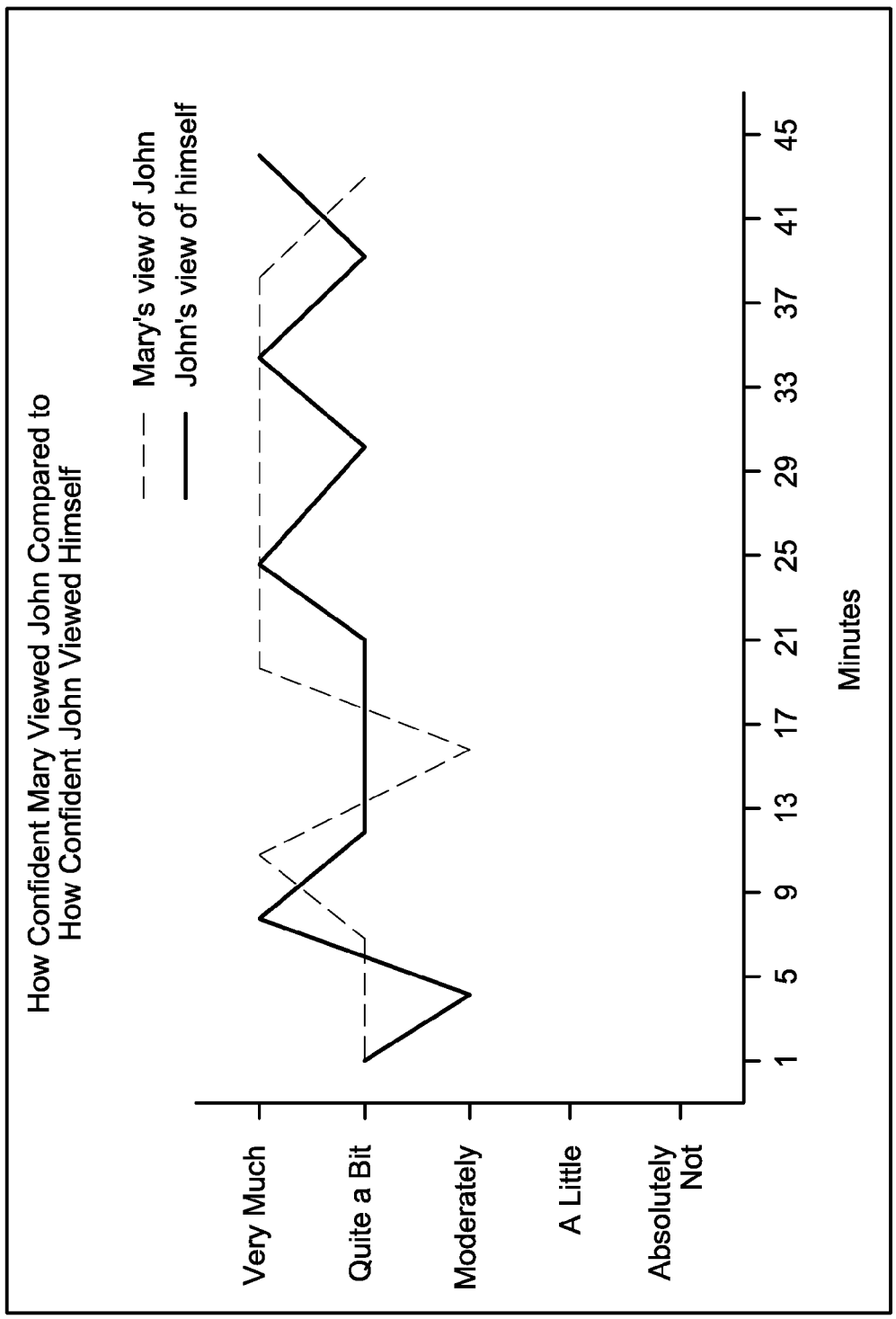
FIG. 18 shows an example of a graphic display of a time sequence data analysis.

FIG. 18 shows another example of a graphic display 1800, this time comparing, again as an example two participants Mary and John, Mary's Other-View with John's Self-View. The graphic display 1800 can be provided in the graph display portion of the user interface. Both agree that John was moderately to very much confident, but there is some variability where they were more in agreement (e.g. minutes 25 and 37).

Figure 19:
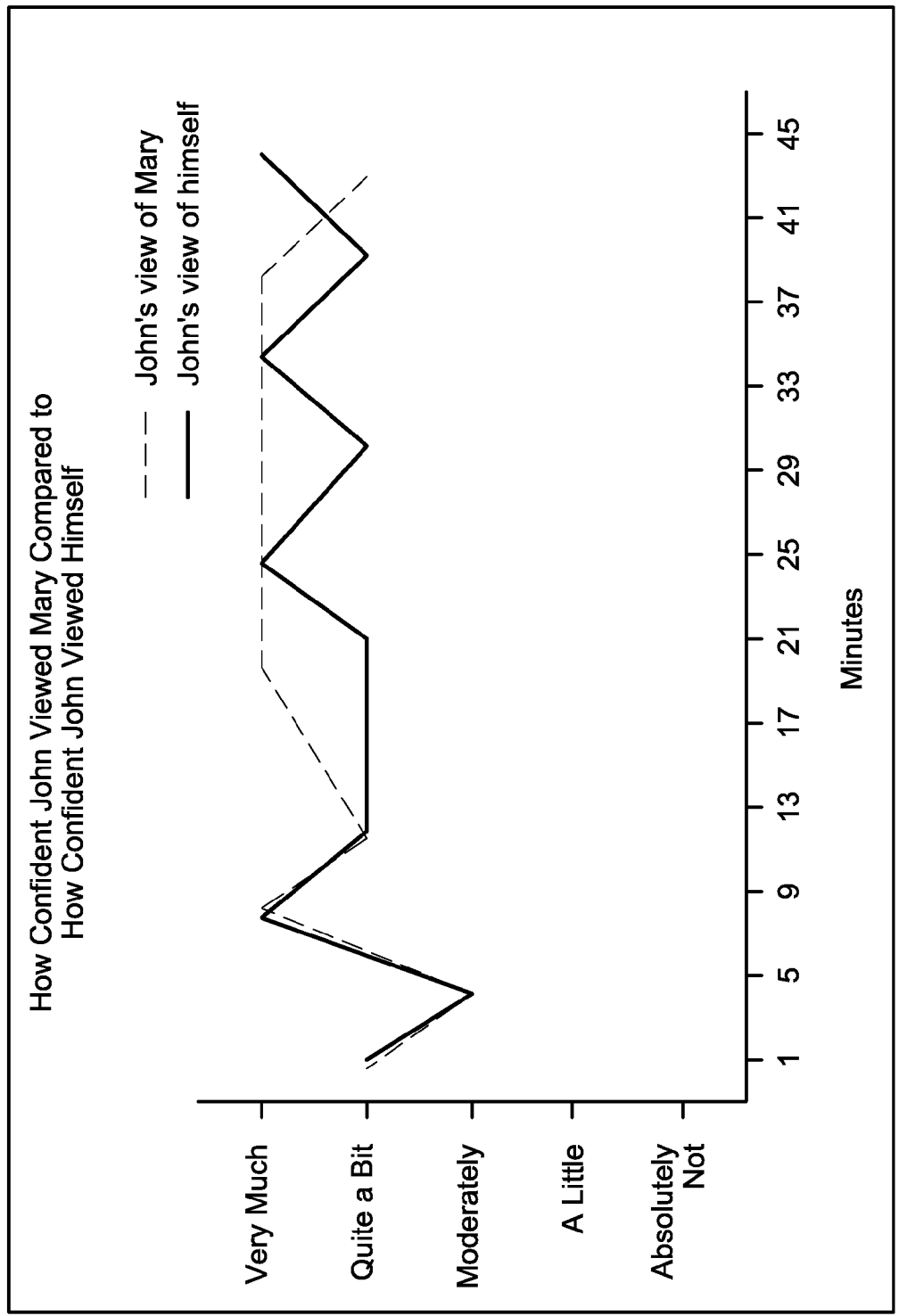
FIG. 19 shows an example of a graphic display of a time sequence data analysis.

FIG. 19 shows another example of a graphic display 1900 that compares the viewpoints for one participant comparing his Self-View with his Other-View. The graphic display 1900 can be provided in the graph display portion of the user interface. Comparing these two viewpoints for the same person can clarify assumptions of similarity-dissimilarity. The graph displays the individual data points for each view, and examination of the graph shows that, again using the two participants Mary and John as an example, John was assuming complete similarity with Mary for the first 13 minutes of their conversation and at minutes 25 and 37.

Figure 20:
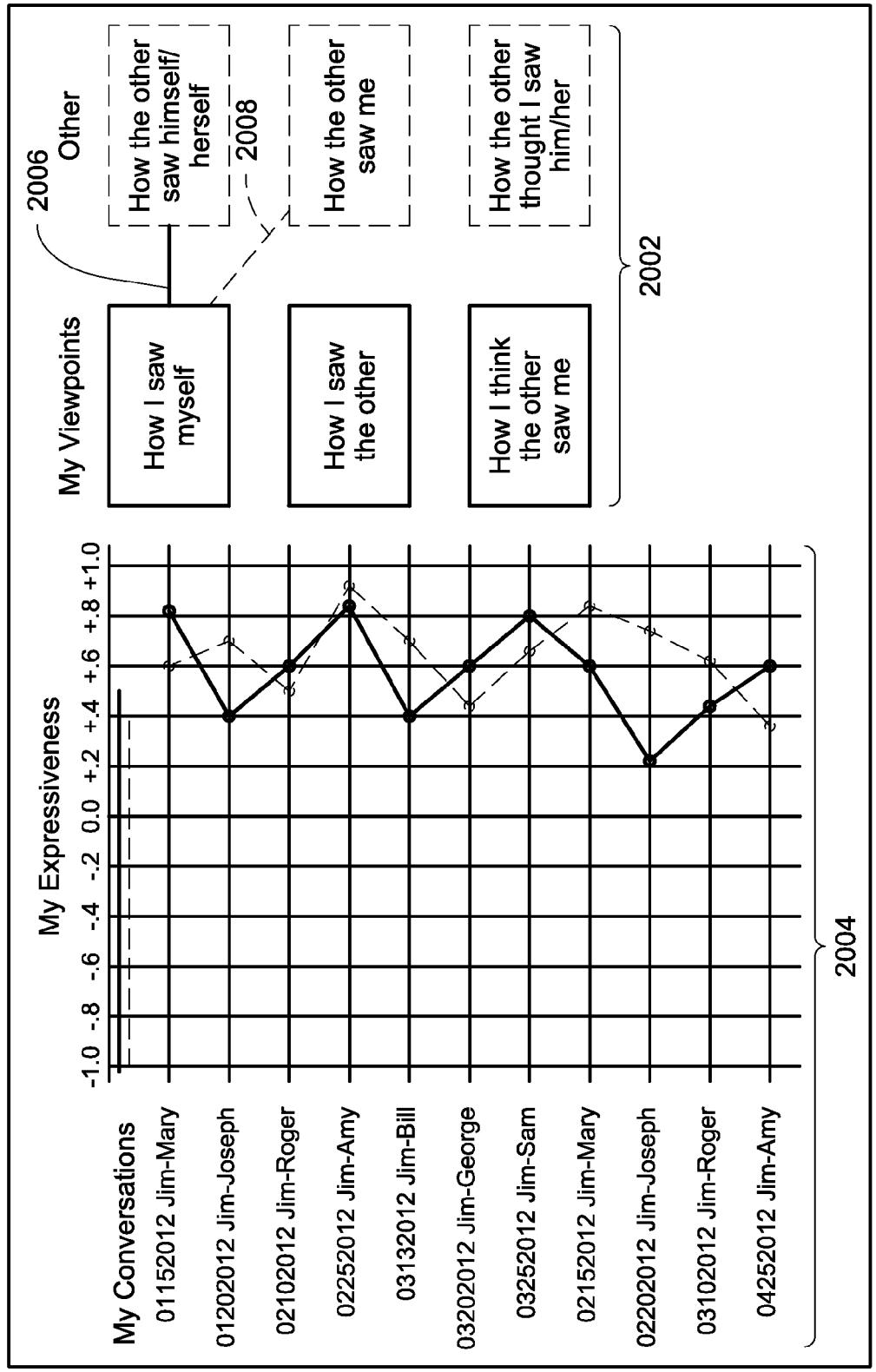
FIG. 20 shows an example of a graphic display of data analysis across several face-to-face interactions.

FIG. 20 shows an example of a graphic display 2000 of data analysis across several face-to-face interactions. The graphic display 2000 includes a field display 2002 and a graph 2004, both of which can be provided as portions of the user interface (for example, similar to field display 910 and graph 912 shown in FIGS. 9A and 9B). The field display 2002 is selectable such that one or more graphic link 2006, 2008 showing the selected comparison of persons' viewpoints that are displayed in the graph 2004 is displayed. The selected comparison changes the graph 2004 that is displayed to show the associated quantified statistical values are graphed between recorded data of conversations. The example shown in graph 2004 displays the statistic of "Expressiveness" that is plotted across several conversations between a first person, "Jim" and other people, "Mary, Joseph, Roger, Amy, Bill, George, and Sam." The graph 2004 shows the statistical graphs, as an example, of Proximity (i.e. Real Similarity) and Expressiveness (Jim's expressiveness) across several partners (Mary, Joseph, Roger, Amy, Bill, George, and Sam). The graph 2004 can display any statistics generated from the data base gathered using the learning tool. The significance of the graphic display 2000 is that it permits grouped or aggregate data for identifying trends, such as across gender, age, race, role position. In this way, a significant trend can be identified, and the user could then go directly to an individual session for closer analysis of particular stored data (AV data and the associated data) of a specific conversations. In this way individual session data can be grouped to show a range of quantified values, e.g. satisfaction, and the user could then examine the individual sessions (e.g. the highest and lowest satisfaction sessions). This can provide great utility for learning, research, and general education.

FIG. 21 shows a flowchart according to an embodiment of the method of using an embodiment of a personal relationship learning tool which includes a camera system which obtains a video data including a substantially face-on first video of the first person and a substantially face-on second video of the second person during a face-to-face conversation between the first and second persons, an audio recording system which obtains an audio data of the first and second persons during the face-to-face conversation between the first and second persons, a computer system which receives the video data and the audio data, and a ranking system which allows the first and second persons, respectively and independently, to rank first and second query statements with respect to the face-to-face conversation. The method 3000 includes placing 3002 the first and second persons in a face-to-face relationship, obtaining 3004 the video data and the audio data, combining 3006 the video data and the audio data to an audio-video (AV) data file and storing the AV data file in the computer system, playing 3008 at least a portion of the AV data file with the computer system, and while the AV data file is being played, having 3010 the first person consider the first query statement and provide a first ranking with respect to the query statement, and having 3012 the second person, independent from the first person, consider the second query statement and provide a second ranking, creating 3014 a comparison as a function of time of the first and second rankings relative to the AV data file, and displaying 3016 to at least one of the first and second persons the comparison as a function of time of the first and second rankings relative to the AV data file, wherein periods of similarities and differences between the first and second rankings can be observed and discussed, which becomes points of learning.

FIG. 22 shows a flowchart of an embodiment of the method of analyzing data gathered by a personal relationship learning tool, wherein the tool includes a data gathering system that gathers data about persons during a conversation among them and a computer system connected to the data gathering system for receiving the data and storing. The tool further includes a ranking system which allows at least some of the persons to independently rank first and second query statements with respect to the conversation. The method 4000 shown in FIG. 22 includes playing 4002 the stored data with the computer system to allow one of the persons to rank a first query statement with the ranking system to obtain a first ranking and to allow another of the persons to rank a second query statement with the ranking system to obtain a second ranking. The method 4000 includes creating 4004 with the computer system a comparison as a function of time of the first and second rankings relative to the conversation among the persons. The method 4000 includes displaying 4006 with the computer system the comparison as a function of time of the first and second rankings relative to the conversation among the persons, wherein periods of similarities and differences between the first and second rankings can be observed and discussed, which then become points of learning.

While the disclosed learning tool and method have been described in conjunction with a preferred embodiment, it will be obvious to one skilled in the art that other objectives and refinements of the disclosed method, system, and devices may be made within the purview and scope of the disclosure. This disclosure, in its various aspects and disclosed forms, is well adapted to the attainment of the stated objects and advantages of others. The disclosed details are not to be taken as limitations on the claims.

What is claimed is:

1. A personal relationship learning tool for first and second persons, comprising:
a camera system configured to obtain a video data of a face-on first image of the first person and a face-on second image of the second person during a face-to-face conversation between the first and second persons, wherein the face-on first image includes facial expressions and eye movements of the first person, and the face-on second image includes facial expressions and eye movements of the second person;
an audio recording system to obtain audio data of the face-to-face conversation audio of the first and second persons during the face-to-face conversation between the first and second persons;
a computer system connected to the camera system and the audio recording system, that receives the video data and the audio data, combines the video data and the audio data to form an audio-video (AV) data file, and stores the AV data file,
the computer system configured to aid in analyzing the AV data file by playing the AV data file, during the playing of the AV data file, the computer system providing, at a moment of the AV data file, a first query statement to the first person and a second query statement to the second person,
wherein the first query statement includes a first request to assume a first viewpoint, the first viewpoint including a social view of how the first person thinks the second person is viewing the first person, and
the second query statement includes a second request to assume a second viewpoint, the second view point including an other view of how the second person views the first person;
a first ranking device connected to the computer system, which allows the first person to provide a first rank to the first query statement; and
a second ranking device connected to the computer system, which allows the second person to provide a second rank to the second query statement,
the computer system receives the first rank and the second rank, stores the first rank and the second rank as a comparative rank data,
the computer system configured to display the comparative rank data as a function of time of the AV data file, which shows periods of similarities and differences of the first rank and the second rank, the comparative rank data includes a comparison of the social view to the other view,
wherein the periods of similarities and differences are for being observed and discussed becoming points of learning to first and second persons.

2. A personal relationship learning tool for first and second persons, comprising:
a camera system configured to obtain a video data of a face-on first image of the first person and a face-on second image of the second person during a face-to-face conversation between the first and second persons, wherein the face-on first image includes facial expressions and eye movements of the first person, and the face-on second image includes facial expressions and eye movements of the second person;
an audio recording system to obtain audio data of the face-to-face conversation audio of the first and second persons during the face-to-face conversation between the first and second persons;
a computer system connected to the camera system and the audio recording system, that receives the video data and the audio data, combines the video data and the audio data to form an audio-video (AV) data file, and stores the AV data file,
the computer system configured to aid in analyzing the AV data file by playing the AV data file, during the playing of the AV data file, the computer system providing, at a moment of the AV data file, a first query statement to the first person and a second query statement to the second person;

a first ranking device connected to the computer system, which allows the first person to provide a first rank to the first query statement; and a second ranking device connected to the computer system, which allows the second person to provide a second rank to the second query statement, the computer system receives the first rank and the second rank, stores the first rank and the second rank as a comparative rank data, the computer system configured to display the comparative rank data as a function of time of the AV data file, which shows periods of similarities and differences of the first rank and the second rank, wherein the periods of similarities and differences are for being observed and discussed becoming points of learning to first and second persons, wherein the camera system includes a prism configured in front of an aperture assembly of a camera, the prism including a first surface, a second surface, and an aperture assembly surface, the face-on first image being received at the first surface of the prism and being refracted towards the aperture assembly of the camera, the face-on second image being received at the second surface of the prism and being refracted towards the aperture assembly of the camera, and the aperture surface facing the aperture assembly of the camera.

3. The tool in accordance with claim 1, wherein the camera system includes a first aperture for receiving the face-on first image; and a second aperture for receiving the face-on second image.

4. The tool in accordance with claim 1, wherein the computer system includes a processor which combines the face-on first image and the face-on second image to create a third image that shows at least a portion of the face-on first image and at least a portion of the face-on second image; and the computer system includes a display that shows the third image.

5. The tool in accordance with claim 1, wherein the computer system includes an interface which includes a third image that shows at least a portion of the face-on first image and at least a portion of the face-on second image, the first query statement including a first statement for the first person to consider and a first viewpoint from which to consider the first statement, the second query statement including a second statement for the second person to consider and a second viewpoint from which to consider the second statement, a graph showing a comparison of the comparative rank data as the function of time, a dynamic synchronization of the third image with a slider control which is movable along an axis of a time graph, wherein the comparison of the comparative rank data and the third image are displayed synchronized together.

6. The tool in accordance with claim 5, wherein the review interface includes a bar comparison of averages of the comparison of the comparative rank data for the time graph.

7. A personal relationship learning tool for first and second persons, comprising:

a review interface for a computer system storing therein an audio-video (AV) data file of a video data and an audio data of a face-to-face conversation between first and second persons, wherein the video data includes a face-on first image of the first person and a face-on second image of the second person during the face-to-face conversation between the first and second persons, wherein the face-on first image includes facial expressions and eye movements of the first person, and the face-on second image includes facial expressions and eye movements of the second person, and the audio data includes a face-to-face conversation audio of the first and second persons during the face-to-face conversation between the first and second persons, the review interface playing synchronously the face-on first image, the face-on second image, and the face-to-face conversation audio;

a ranking system connected to the computer system, which allows the first and second persons to independently provide a rank to a query statement provided by the computer system with respect to the face-on first image, the face-on second image, and the face-to-face conversation audio;

the review interface displaying the rank as a function of time of the AV data file, which shows periods of similarities and differences of the rank, the rank including a social view of how the first person thinks the second person is viewing the first person, wherein the periods of similarities and differences to be observed and discussed becoming points of learning to first and second persons; and a camera for obtaining a second video data of the first and second persons during the displaying of the rank as the function of time of the AV data file.

8. A personal relationship learning tool for interpersonal relationships, comprising:

a data gathering system during a conversation among persons that gathers data about the persons during the conversation, the data gathering system includes a camera system configured to obtain the data which includes a face-on first image of one of the persons and a face-on second image of another of the persons, wherein the face-on first image includes facial expressions and eye movements of the one of the persons, and the face-on second image includes facial expressions and eye movements of the another of the persons;

a computer system connected to the data gathering system for receiving the data, the computer system configured to aid in providing at a moment of the data a first query statement to the one of the persons and a second query statement to the another of the persons;

a first ranking device connected to the computer system allowing said one of the persons to provide a first rank to the first query statement; and a second ranking device connected to the computer system allowing said another of the persons to provide a second rank to the second query statement, wherein the computer system receives the first rank and the second rank and stores them, the computer system displaying the first and second rank as comparative rank data as a function of time of the conversation to show periods of similarities and differences of the first and second ranks, the comparative rank data including a comparison of a social view to the other view, wherein the social view includes how one of the persons thinks the another one of the persons is viewing the one of the persons, and the other view includes how the another one of the persons views the one of the persons, wherein the periods of similarities and differences are for being observed and discussed to become points of learning about the interpersonal relationships of the persons.

* * * * *